United States Patent
Sun et al.

(10) Patent No.: US 11,395,226 B2
(45) Date of Patent: Jul. 19, 2022

(54) WAKE-UP MANAGEMENT METHOD, TIMER MANAGEMENT METHOD, AND TERMINAL DEVICE

(71) Applicant: HUAWEI TECHNOLOGIES CO., LTD., Guangdong (CN)

(72) Inventors: Wenyong Sun, Beijing (CN); Jun Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 16/960,270

(22) PCT Filed: Mar. 16, 2018

(86) PCT No.: PCT/CN2018/079244
§ 371 (c)(1),
(2) Date: Jul. 6, 2020

(87) PCT Pub. No.: WO2019/174025
PCT Pub. Date: Sep. 19, 2019

(65) Prior Publication Data
US 2021/0076323 A1   Mar. 11, 2021

(51) Int. Cl.
*H04W 52/02*   (2009.01)

(52) U.S. Cl.
CPC ... *H04W 52/0216* (2013.01); *H04W 52/0235* (2013.01); *H04W 52/0248* (2013.01); *H04W 52/0277* (2013.01)

(58) Field of Classification Search
CPC ......... H04W 52/0216; H04W 52/0235; H04W 52/0248; H04W 52/0277; Y02D 30/70; G06F 1/32
See application file for complete search history.

(56) References Cited

U.S. PATENT DOCUMENTS

2012/0122495 A1* 5/2012 Weng .................. H04W 68/025
455/458
2014/0059366 A1   2/2014 Matsushita et al.
(Continued)

FOREIGN PATENT DOCUMENTS

CN    101416401 A    4/2009
CN    101601264 A   12/2009
(Continued)

OTHER PUBLICATIONS

Office Action dated Nov. 27, 2020 issued in Chinese Application No. 201880067493.7 (9 pages).

*Primary Examiner* — Pao Sinkantarakorn
*Assistant Examiner* — Kabir U Jahangir

(57) ABSTRACT

After running an application to register and set a timer, a terminal device determines whether at least two timers that support wake-up have triggering time ranges, groups timers having the triggering time ranges, determines a triggering moment of each of M timer groups to obtain M triggering moments, determines a triggering moment of each of N timers that have no triggering time range to obtain N triggering moments, sets an earliest moment in the M triggering moments and the N triggering moments as an RTC moment, and when the RTC moment is reached, perform wake-up if the terminal device is in a sleep state.

10 Claims, 19 Drawing Sheets

(56) References Cited

U.S. PATENT DOCUMENTS

2014/0274223 A1* 9/2014 Kleve ............... H04W 52/0209
　　　　　　　　　　　　　　　　　　　　　455/574
2017/0055208 A1* 2/2017 Chen .................... H04W 52/02
2017/0242473 A1　 8/2017 Bostick et al.

FOREIGN PATENT DOCUMENTS

| CN | 102012735 | A | 4/2011 |
| CN | 102781073 | A | 11/2012 |
| CN | 103345415 | A | 10/2013 |
| CN | 104182029 | A | 12/2014 |
| CN | 104506740 | A | 4/2015 |
| CN | 105388991 | A | 3/2016 |
| CN | 105828424 | A | 8/2016 |
| CN | 106850944 | A | 6/2017 |
| WO | 2014180329 | A1 | 11/2014 |

\* cited by examiner

TO FIG. 5d-2

WAKE-UP MANAGEMENT METHOD, TIMER MANAGEMENT METHOD, AND TERMINAL DEVICE

CROSS-REFERENCE TO RELATED APPLICATIONS

This application is a National Stage of International Application No. PCT/CN2018/079244, filed on 16 Mar. 2018, which is hereby incorporated by reference in its entirety.

TECHNICAL FIELD

This disclosure relates to the field of communications, and in particular, to a wake-up management method, a timer management method, and a terminal device.

BACKGROUND

As mobile phone functions become more diversified, increasing applications are installed on mobile phones, and users spend an increasing amount of time on the mobile phones. When a user performs various operations in a normal working state of a mobile phone, battery power of the mobile phone is consumed. After the mobile phone enters a sleep state, if an interruption signal is generated because, for example, the mobile phone receives a call or an SMS message, an application periodically starts to check a network connection, or the user presses a power button, the mobile phone enters a normal working state from the sleep state. This further consumes the battery power of the mobile phone, and shortens standby duration of the mobile phone.

SUMMARY

Embodiments of this disclosure provide a wake-up management method and a terminal device, to reduce a quantity of times that a terminal device performs wake-up in a time period, and to reduce power consumption of the terminal device in the time period.

According to a first aspect, an embodiment of this disclosure provides a wake-up management method, including: setting at least two timers in a terminal device, where the at least two timers support wake-up, and each of the at least two timers corresponds to an operation related to an application; determining, by the terminal device, whether each of the at least two timers has a triggering time range, and grouping timers having the triggering time ranges, to obtain M timer groups, where M is an integer greater than 0, and a common intersection set of triggering time ranges of all timers in each of the M timer groups is not empty; determining, by the terminal device, a triggering moment of each of the M timer groups, to obtain M triggering moments; determining N timers that have no triggering time range, and determining a triggering moment of each of the N timers, to obtain N triggering moments, where N is an integer greater than 0; setting, by the terminal device, an earliest moment in the M triggering moments and the N triggering moments as an RTC moment; and when the RTC moment is reached, performing, by the terminal device, wake-up if the terminal device is in the sleep state.

In the technical solution provided in this embodiment of this disclosure, after running an application to register and set a timer, the terminal device identifies whether the timer supports wake-up, groups timers that support wake-up and have triggering time ranges, to obtain each timer group that supports wake-up and has a triggering time range, determines a triggering moment of each timer group that supports wake-up and has the triggering time range, determines a triggering moment of each timer that supports wake-up and does not have a triggering time range, and sets an earliest moment in the triggering moments as an RTC moment, so that when the RTC moment is reached, the terminal device can perform wake-up. In the prior art, whether the timer supports wake-up is not identified. During grouping, the timers having the triggering time ranges are grouped to obtain timer groups having the triggering time. When the triggering moment of each timer group having the triggering time range is determined, because a triggering time range of a timer that does not support wake-up in the timer group is relatively early, the triggering moment of the timer group may be relatively early, and when the earliest moment in the triggering moments is set as the RTC moment, the RTC moment may be consequently relatively early. Compared with the prior art, according to the wake-up management method provided in this embodiment of this disclosure, when the RTC moment is set, a timer that does not support wake-up may not be considered. To some extent, a triggering moment of a timer group having a triggering time may be delayed. In this case, the RTC moment is delayed, and the terminal can delay performing wake-up, to reduce a quantity of times that the terminal device performs wake-up in a time period.

In a possible implementation, the timer may be an alarm timer or another timer.

In a possible implementation, M may be zero. To be specific, none of the timers that the terminal device runs the application to register and set and that support wake-up has a triggering time range. In this case, the terminal device determines N timers that do not have the triggering time interval, determines a triggering moment of each of the N timers, and after obtaining N triggering moments, sets an earliest moment in the N triggering moments as the RTC moment.

In a possible implementation, N may be zero. To be specific, all the timers that the terminal device runs the application to register and set and that support wake-up have triggering time ranges. In this case, the terminal device groups the timers that support wake-up and that have the triggering time ranges, to obtain M timer groups, determines a triggering moment of each of the M timer groups, to obtain M triggering moments, and sets an earliest moment in the M triggering moments as the RTC moment.

In a possible implementation, the terminal device may group the N timers that do not have the triggering time range, where one timer is determined in one timer group, to obtain some timer groups, and determines a triggering moment of each timer in the timer groups, to obtain N triggering moments.

Optionally, when the terminal device determines the triggering moment of each of the M timer groups, for example, when the terminal device determines a triggering moment of a first timer group in the M timer groups, the terminal device may determine a latest moment in a first intersection set as the triggering moment of the first timer group, where the first intersection set is a common intersection set of triggering time ranges of all timers in the first timer group. The terminal device may sequentially determine a triggering moment of each of the remaining M−1 timer groups by using a similar method.

The first timer group may be any one of the M timers, and may include a first timer and a second timer that have different triggering time ranges. The terminal device runs a first application to register and set the first timer, and runs a second application to register and set the second timer. The first timer is used to instruct the terminal device at a specified moment to perform wake-up and perform a first operation corresponding to the first application, and the first timer corresponds to the first operation of the first application. The second timer is used to instruct the terminal device at a specified moment to perform wake-up and perform a second operation corresponding to the second application, and the second timer corresponds to the second operation of the second application.

In the technical solution provided in this embodiment of this disclosure, when determining the triggering moment of each of the M timer groups, the terminal device uses a latest moment in a common intersection set of triggering time ranges of all timers in each timer group as the triggering moment of the timer group, and the triggering moment of the timer group is delayed. In this way, the RTC moment is delayed, and the terminal delays performing wake-up, to reduce a quantity of times that the terminal device performs wake-up in a time period.

In a possible implementation, each of the M timer groups may include only one timer. In other words, timers that support wake-up and have triggering time ranges are not grouped. In this case, the terminal device uses a latest moment in a triggering time ranges of a timer that supports wake-up as a fixed triggering moment of the timers. In addition, a fixed triggering moment of a timer that supports wake-up and that does not have a triggering time range is determined, and the terminal device may set an earliest moment in fixed triggering moments of all timers that support wake-up as the RTC moment.

Optionally, if the triggering moment of the first timer group is set as the RTC moment, when the RTC moment is reached, the terminal device triggers all timers in the first timer group, and the terminal device performs operations related to applications corresponding to all the timers in the first timer group, including performing the first operation corresponding to the first application and performing the second operation corresponding to the second application.

Optionally, after the terminal device triggers all the timers in the first timer group, the terminal device may delete all the timers in the first timer group.

In the technical solution provided in this embodiment of this disclosure, after triggering the timer, the terminal device may perform the operation related to the application corresponding to the timer, and may delete the timer, thereby improving implementability of the solution.

Optionally, if the triggering moment of the first timer group is set as the RTC moment, when the RTC moment is reached, for timers in the remaining M−1 timer groups in the M timer groups except the first timer group, because the fixed triggering moments of the timers in the M−1 timer groups have not been reached, the terminal device may not process the timers in the M−1 timer groups. For the N timers, because fixed triggering moments of timers in the N timer groups have not been reached, the terminal device may also not process the N timers. The terminal device may delete the triggering moment of the first timer group, and the terminal device may set, as a new RTC moment, an earliest moment in the N triggering moments and the remaining M−1 triggering moments obtained after the triggering moment of the first timer group is removed from the M triggering moments.

When the new RTC moment is reached, the terminal device may trigger all timers in a timer group of which a triggering moment is set as the new RTC moment, perform operations related to applications corresponding to all timers in the timer group, delete the triggering moment of the timer, and set a next RTC moment by using the similar method.

Optionally, if the triggering moment of the first timer group is set as the RTC moment, when the RTC moment is reached, if the terminal device registers and sets a new timer that supports wake-up and has an available triggering time range, or the terminal device modifies triggering time ranges of one or more timers in the M−1 timer groups based on a situation, the terminal device may regroup the timers in the M−1 timer groups based on the first rule. This is not specifically limited herein.

In the technical solution provided in this embodiment of this disclosure, when the RTC moment is reached, the terminal device may be set as a triggering moment of a timer at the RTC moment, and set the earliest moment in remaining triggering moments as the new RTC moment, thereby improving implementability of the solution.

Optionally, when the terminal device groups, according to the preset first rule, the timers that support wake-up and have the triggering time ranges, the terminal device may sort the timers that have the triggering time range in ascending order of earliest available triggering moments. If the terminal device determines that an earliest available triggering moment of a third timer is the earliest, a timer of which a triggering time range intersects with the triggering time range of the third timer and the third timer may be determined to be in a second timer group. For the timers that are in the timers having the triggering time ranges and that are not determined to be in the second timer group, similarly, the terminal device may sort these timers in ascending order of earliest available triggering moments. If the terminal device determines that an earliest available triggering moment of a fourth timer is the earliest, a timer of which a triggering time range intersects with the triggering time range of the fourth timer and the fourth timer may be determined in a third timer group. The determining is performed in sequence until all the timers having the triggering time ranges are allocated to corresponding timer groups, to obtain the M timer groups in sequence. It should be noted that the second timer group and the third timer group herein are merely examples, the second timer group and the third timer group are not a same group, the second timer group and the foregoing first timer group may be a same group, and the third timer group and the foregoing first timer group may also be a same group.

In the technical solution provided in this embodiment of this disclosure, when the timers that support wake-up and have the triggering time ranges are grouped, starting from a timer that has the earliest available triggering moment, timers of which the available triggering moments have a common intersection set are determined in a timer group, and similarly, the timers that have not been grouped are sorted in ascending order of earliest available triggering moments, and each timer group is determined in sequence. The grouping starts from the timer of the earliest available triggering moment, and fixed triggering moments of timers in a same group are unified, so that the fixed triggering moment of the timer of which the earliest available triggering moment is the earliest may be delayed, thereby delaying the RTC moment to some extent, and reducing a quantity of times of performing wake-up in a time period.

In a possible implementation, for a timer that does not support wake-up, when the terminal device is in a normal working state, the terminal device may determine whether a current moment is later than a moment in a triggering time range of the timer that cannot be woken up, and if the current moment is later than the moment, the terminal device triggers the timer that cannot be woken up, and performs a related operation corresponding to an application that registers the timer that cannot be woken up.

According to a second aspect, an embodiment of this disclosure provides a terminal device. The terminal device has a function of implementing the terminal device in the foregoing method. This function may be implemented by hardware, or may be implemented by hardware by executing corresponding software. The hardware or the software includes one or more modules corresponding to the foregoing functions.

In a possible implementation, the terminal device includes a memory and one or more processors, where the memory stores one or more programs, the one or more programs include an instruction, and when the instruction is executed by the terminal, the terminal device is enabled to perform:

setting at least two timers, where the at least two timers support wake-up, and each of the at least two timers corresponds to an operation related to an application; determining whether each of the at least two timers has a triggering time range; grouping, according to a preset first rule, timers that have triggering time ranges, to obtain M timer groups, where M is an integer greater than 0, and a common intersection set of triggering time ranges of all timers in each of the M timer groups is not empty; determining a triggering moment of each of the M timer groups, to obtain M triggering moments; determining N timers that have no triggering time range, and determining a triggering moment of each of the N timers, to obtain N triggering moments, where N is an integer greater than 0; setting an earliest moment in the M triggering moments and the N triggering moments as an RTC moment; and when the RTC moment is reached, performing wake-up if the terminal device is in a sleep state.

Optionally, when the instruction is executed by the terminal device, the terminal device is further enabled to perform: when determining a triggering moment of a first timer group in the M timer groups, determining that a latest moment in a first intersection set is the triggering moment of the first timer group, where the first intersection set is a common intersection set of triggering time ranges of all timers in the first timer group, the first timer group comprises a first timer and a second timer that have different triggering time ranges, the first timer corresponds to a first operation of a first application, and the second timer corresponds to a second operation of a second application.

Optionally, when the instruction is executed by the terminal device, the terminal device is further enabled to perform: if the triggering moment of the first timer group is set as the RTC moment, when the RTC moment is reached, triggering all timers in the first timer group; performing the first operation and the second operation; and after all the timers in the first timer group are triggered, deleting all the timers in the first timer group.

Optionally, when the instruction is executed by the terminal device, the terminal device is further enabled to perform: if the triggering moment of the first timer group is set as the RTC moment, when the RTC moment is reached, deleting the triggering moment of the first timer group; and setting, as a new RTC moment, an earliest moment in the N triggering moments and the remaining M−1 triggering moments obtained after the triggering moment of the first timer group is removed from the M triggering moments.

Optionally, when the instruction is executed by the terminal device, the terminal device is further enabled to perform: sorting the timers having the triggering time ranges in ascending order of earliest available triggering moments; if it is determined that an earliest available triggering moment of a third timer is the earliest, determining a timer of which a triggering time range intersects with a triggering time range of the third timer and the third timer to be in a second timer group; sorting, in ascending order of earliest available triggering moments, timers that are in the timers having the triggering time ranges and that are not determined to be in the second timer group; and if it is determined that the earliest available triggering moment of a fourth timer is the earliest, determining a timer of which a triggering time range intersects with a triggering time range of the fourth timer and the fourth timer to be in a third timer group.

The embodiments of this disclosure provide a timer management method and a terminal device, to reduce a quantity of times that a terminal device performs wake-up, and reduce power consumption of the terminal device.

According to a first aspect, an embodiment of this disclosure provides a timer management method, including: when a terminal device performs wake-up from a sleep state based on a first interruption signal, determining, by the terminal device, a first moment, where the first moment is a moment at which the first interruption signal is sent, the first interruption signal may be sent by a module in the terminal device, may be sent by an RTC module, may be sent by a Wi-Fi module, or may be sent by another module, and the terminal device can determine a module that sends the first interruption signal; determining, by the terminal device, whether the wake-up performed based on the first interruption signal is non-alarm wake-up; if the wake-up is non-alarm wake-up, determining, by the terminal device, a first target timer, where the first target timer is registered and set by the terminal device by running a first target application, and is used to instruct the terminal device to perform wake-up at a specified moment and perform a first target operation corresponding to the first target application at a specified moment, the first target timer corresponds to the first target operation of the first target application and has a triggering time range, a time range between an available triggering moment of the first target timer and the first moment is less than a preset first duration threshold, and the available triggering moment of the first target timer is any moment in the triggering time range of the first target timer; and deleting, by the terminal device, the first target timer.

In the technical solution provided in this embodiment of this disclosure, when the terminal device performs non-alarm wake-up, the terminal device determines, by using a sending moment (the first moment) of an interruption signal in the current non-alarm wake-up as a reference, the first target timer whose available triggering moment and the first moment have duration less than the preset first duration threshold, where the first target timer is used to instruct the terminal device to perform wake-up at a specified moment and has a triggering time range. The available triggering moment may be any moment in the triggering time range of the first target timer. The terminal device deletes the first target timer, so that the terminal device may no longer perform wake-up at a moment because of the first target timer, and a quantity of times of performing wake-up is reduced, thereby reducing power consumption of the terminal device.

Optionally, if the fixed triggering moment of the first target timer has been set as the RTC moment, the terminal device may delete the RTC moment.

In the technical solution provided in this embodiment of this disclosure, because the RTC moment set by using the fixed triggering moment of the first target timer is deleted, it is implemented that the terminal device may not perform wake-up when the fixed triggering moment of the first target timer is reached, thereby reducing a quantity of times that the terminal device performs wake-up.

Optionally, before the terminal device deletes the first target timer, the terminal device may trigger the first target timer, and after triggering the first target timer, the terminal device may perform the first target operation corresponding to the first target application.

In the technical solution provided in this embodiment of this disclosure, the terminal device may trigger the first target timer and may perform the first target operation corresponding to the first target application, so that it is implemented to trigger the first target timer in advance and perform the corresponding operation, thereby improving implementability of the solution.

Optionally, after the terminal device deletes the first target timer, when the terminal device has not entered the sleep state again, the terminal device may determine whether a second moment exists, where the second moment is a sending moment of an interruption signal for non-alarm wake-up. If the second moment exists, the terminal device determines, by using the second moment as a reference, a second target timer and a third target timer, where the second target timer is registered and set by the terminal device to instruct the terminal device to perform wake-up at a first fixed triggering moment, and the third target timer is registered and set by the terminal device to instruct the terminal device to perform wake-up at a second fixed triggering moment. The second target timer has a first triggering time range, and the third target timer has a second triggering time range. A time range between a first available triggering moment of the second target timer and the second moment is less than a preset second duration threshold, and the first available triggering moment is earlier than the second moment. Duration between a second available triggering moment of the third target timer and the second moment is less than a preset third duration threshold, and the second available triggering moment is later than the second moment. The first available triggering moment is any moment within the first triggering time range, and the second available triggering moment is any moment within the second triggering time range. The terminal device determines the first fixed triggering moment and the second fixed triggering moment as the second moment.

In the technical solution provided in this embodiment of this disclosure, after determining the sending moment (the second moment) of the interruption signal for non-alarm wake-up, the terminal device may determine the second target timer and the third target timer whose available triggering moments and the second moment each have duration less than the preset duration threshold, and set the fixed triggering moments of the second target timer and the third target timer as the second moment. In this way, a quantity of times that the terminal device performs wake-up can be further reduced.

Optionally, after determining the first fixed triggering moment and the second fixed triggering moment as the second moment, the terminal device may delete the first triggering time range and the second triggering time range.

According to a second aspect, an embodiment of this disclosure provides a terminal device. The terminal device has a function of implementing the terminal device in the foregoing method. This function may be implemented by hardware, or may be implemented by hardware by executing corresponding software. The hardware or the software includes one or more modules corresponding to the foregoing function.

In a possible implementation, the terminal device includes a memory and one or more processors, where the memory stores one or more programs, the one or more programs include an instruction, and when the instruction is executed by the terminal device, the terminal device is enabled to perform:

when the terminal device performs wake-up from a sleep state based on a first interruption signal, determining a first moment, where the first moment is a moment at which the first interruption signal is sent; determining whether the wake-up performed based on the first interruption signal is non-alarm wake-up; if the performed wake-up is non-alarm wake-up, determining a first target timer, where the first target timer is registered and set by the terminal device by running a first target application, the first target timer corresponds to a first target operation of the first target application and has a triggering time range, duration between an available triggering moment of the first target timer and the first moment is less than a preset first duration threshold, and an available triggering moment of the first target timer is any moment in the triggering time range of the first target timer; and deleting the first target timer.

Optionally, when the instruction is executed by the terminal device, the terminal device is further enabled to trigger the first target timer and perform the first target operation.

Optionally, when the instruction is executed by the terminal device, the terminal device is further enabled to perform: when the terminal device has not entered the sleep state again, determining whether a second moment exists, where the second moment is a moment at which the non-alarm wake-up interruption signal is sent; if the second moment exists, determining a second target timer and a third target timer, where the second target timer and the third target timer are registered and set by the terminal device, the second target timer is used to instruct the terminal device to perform wake-up at a first fixed triggering moment, the third target timer is used to instruct the terminal device to perform wake-up at a second fixed triggering moment, the second target timer has a first triggering time range, the third target timer has a second triggering time range, duration between a first available triggering moment of the second target timer and the second moment is less than a preset second duration threshold, the first available triggering moment is earlier than the second moment, duration between a second available triggering moment of the third target timer and the second moment is less than a preset third duration threshold, the second available triggering moment is later than the second moment, the first available triggering moment is any moment within the first triggering time range, the second available triggering moment is any moment within the second triggering time range; and determining the first fixed triggering moment and the second fixed triggering moment as the second moment.

Optionally, when the instruction is executed by the terminal device, the terminal device is further enabled to delete the first triggering time range and the second triggering time range.

BRIEF DESCRIPTION OF DRAWINGS

FIG. 5d-1 and FIG. 5d-2 are schematic diagrams of another application scenario according to an embodiment of this disclosure;

DESCRIPTION OF EMBODIMENTS

Terms in embodiments of this disclosure are used only for the purpose of describing specific embodiments, but are not intended to limit this disclosure. The terms "one", "a" and "this" of singular forms used in this specification and the appended claims of this disclosure are also intended to include plural forms, unless otherwise specified in the context clearly.

In the embodiments, cases of "greater than" and "less than" are described. It may also be understood that, for a case of "equal to", implementation may be performed according to a case of "greater than", or implementation may be performed according to a case of "less than". Similarly, in the embodiments, cases of "earlier than" and "later than" are also described. For a case of "equal to", implementation may be performed according to a case of "earlier than", or implementation may be performed according to a case of "later than".

Figure 1:
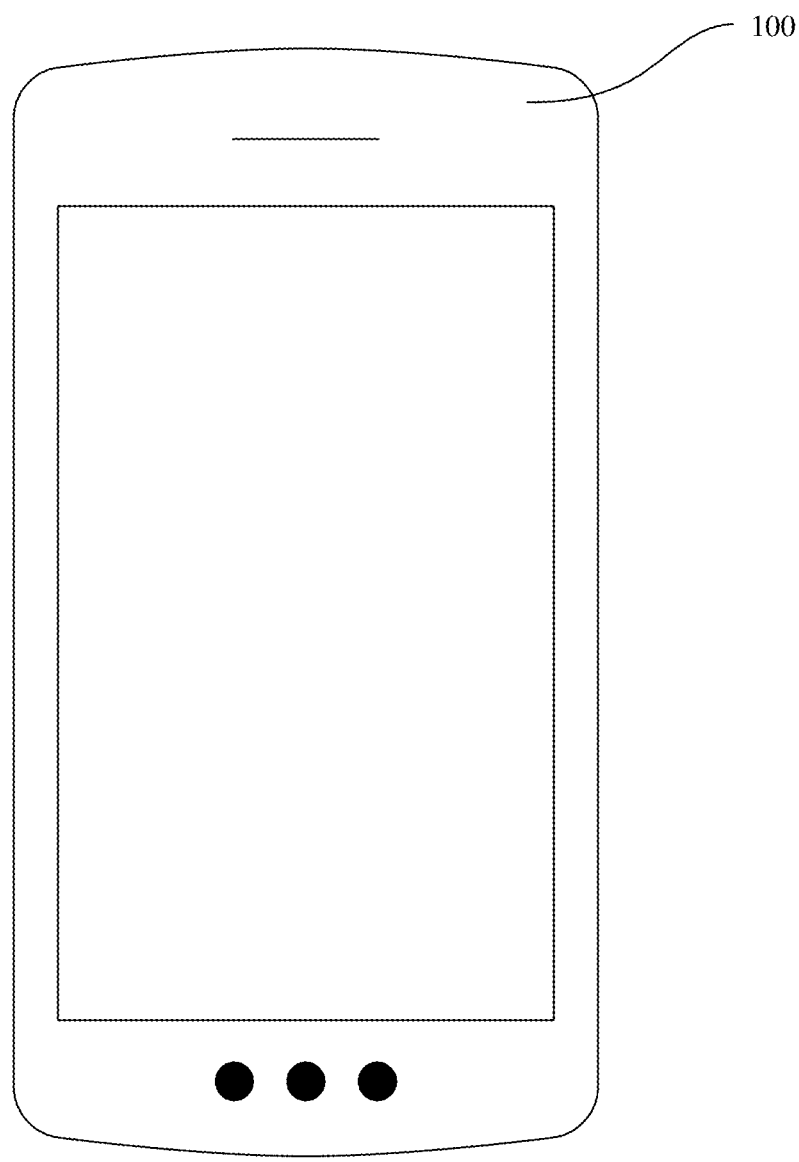
FIG. 1 is a schematic diagram of a terminal device according to an embodiment of this disclosure.

FIG. 1 is a schematic diagram of a terminal device provided in an embodiment of this disclosure. The terminal device 100 in this embodiment of this disclosure may include a mobile phone, a tablet computer, a PDA (personal digital assistant), a POS (point of sales) terminal, a vehicle-mounted computer, a TV (television), a wearable device, an AR (augmented reality) device, a VR (virtual reality) device, and the like.

Figure 2:
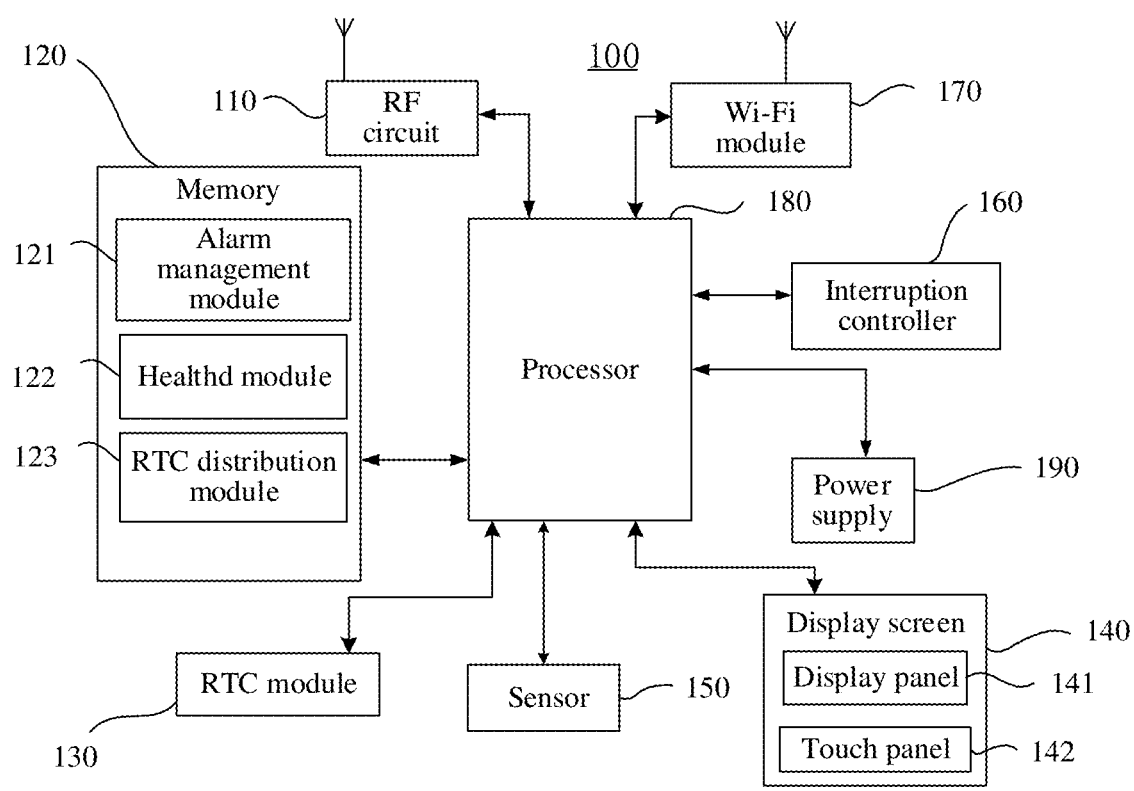
FIG. 2 is a block diagram of a partial structure of a terminal device according to an embodiment of this disclosure.

For example, the terminal device 100 is a mobile phone. FIG. 2 is a block diagram of a partial structure of the mobile phone 100 according to this embodiment of the present invention. Referring to FIG. 2, the mobile phone 100 includes components such as an RF (radio frequency) circuit 110, a memory 120, an RTC module 130, a display screen 140, a sensor 150, an interruption controller 160, a wireless fidelity (Wi-Fi) module 170, a processor 180, and a power supply 190. A person skilled in the art may understand that the mobile phone structure shown in FIG. 2 does not constitute a limitation on the mobile phone, and the mobile phone may include more or fewer components than those shown in the figure, or some components may be combined, or some components may be split, or a component may be deployed differently. Persons skilled in the art may understand that the display screen 140 belongs to a user interface (UI), and the mobile phone 100 may include more or fewer user interfaces than those shown in the figure.

The RF circuit 110 may be configured to receive and send information, or receive and send signals during a call, and particularly, receive downlink information from a base station, and then send the downlink information to the processor 180 for processing. In addition, the RF circuit 110 sends related uplink data to the base station. Generally, the RF circuit includes but is not limited to an antenna, at least one amplifier, a transceiver, a coupler, an LNA (low noise amplifier) and a duplexer. In addition, the RF circuit 110 may further communicate with a network and another device through radio communication. Any communication standard or protocol may be used for the wireless communication, including but not limited to GSM (global system for mobile communications), GPRS (general packet radio service), CDMA (code division multiple access), WCDMA (wideband code division multiple access), LTE long term evolution), email, SMS (short messaging service), and the like.

The memory 120 may be configured to store a software program and a module. The processor 180 performs each functional application and data processing of the mobile phone 100 by running the software program and the module that are stored in the memory 120. The memory 120 may mainly include a program storage area and a data storage area. The program storage area may store an operating system, an application program required for at least one function (such as an audio playback function or an image playback function), and the like. The data storage area may store data (such as audio data and a phone book) created based on usage of the mobile phone 100, and the like. In addition, the memory 120 may include a high-speed random access memory, and may further include a non-volatile memory, for example, at least one magnetic disk storage device, a flash memory, or another volatile solid-state storage device.

An alarm management module 121 is a software module, and may be stored in the memory 120. An application processor (AP) in the processor 180 runs the alarm management module 121 to implement: managing an alarm timer, setting a moment of writing a register of the RTC (real time clock) module 130, triggering a corresponding alarm timer after receiving an RTC interruption instruction, and the like.

A Healthd module 122 is a software module and may be stored in the memory 120. The AP runs the Healthd module 122 to perform: monitoring a battery event from a bottom layer and transferring battery data information to an upper layer for calculation of state information related to a battery level, so that the AP calculates information such as a battery level display, a remaining battery level, and a battery level.

An RTC distribution module 123 is a software module, and may be stored in the memory 120. The AP runs the RTC distribution module 123 to perform: distributing the RTC interruption instruction to a corresponding software module according to a record, where the moment set by the corresponding software module and written into the register of the RTC module 130 is an RTC moment at which the RTC module sends the interruption signal, and the corresponding software module may be the alarm management module 121, the Healthd module 122, or the like.

The RTC module 130 is a clock circuit formed by a crystal oscillator and a related circuit on the main board of the mobile phone. The RTC module 130 generates a system clock with a relatively low frequency through frequency conversion of the circuit. The system clock is increased by one in each processor cycle, and each time the system clock is initialized by using the RTC module 130 at the beginning of the system. Main functions of the RTC module 130 include a clock, a calendar, an alarm clock, and periodically interrupting output. The RTC module 130 may be integrated into a power supply chip of the power supply 190, or may be an independent module. This is not specifically limited herein. As long as the RTC module 130 is continuously supplied with power, a moment can be read from the register of the RTC module 130. When in a normal working state, the AP can write a moment into the register of the RTC module 130. The moment stored in the register of the RTC module 130 may be referred to as an RTC moment. When timing of the RTC module 130 reaches the RTC moment, the RTC module 130 may send the interruption signal. The register of the RTC module 130 may store only one moment, that is, the RTC moment is only one moment, and the RTC moment may be changed. When the AP is in a normal working state, the RTC module 130 may perform: deleting the RTC moment stored in the register of the RTC module 130 until a next moment is written into the register and becomes the RTC moment. Alternatively, the RTC moment stored in the register may not be deleted and is marked as unavailable, until a next moment is written into the register to overwrite the unavailable moment and becomes the RTC moment. This is not specifically limited herein. For example, the RTC module 130 may delete the original RTC moment when the original RTC moment is reached, and the AP writes the next moment into the RTC module 130. The RTC module 130 may not delete the original RTC moment when the original RTC moment is reached, but overwrites the original RTC moment when the next moment is written. In subsequent embodiments, an example in which the RTC module 130 may delete the RTC moment stored in the register of the RTC module 130 until the next moment is written into the register as the RTC moment is used for description.

The terminal device may further include another input device. The input device may be configured to receive input digit or character information, and generate a keyboard signal input related to user setting and function control of the mobile phone 100. Specifically, the other input devices may include but are not limited to one or more of a physical keyboard, a function key (such as a volume control key or an on/off key), a trackball, a mouse, a joystick, and an optical mouse (the optical mouse is a touch-sensitive surface that does not display a visual output, or an extension of a touch-sensitive surface formed by a touchscreen).

The display screen 140 may be configured to display information entered by a user or information provided for a user and various menus of the mobile phone 100, and may further accept a user input. Specifically, the display screen 140 may include a display panel 141 and a touch panel 142. The display panel 141 may be configured by using a liquid crystal display (LCD), an organic light-emitting diode (OLED), or the like. The touch panel 142 is also referred to as a touchscreen, a touch-sensitive screen, or the like; and may collect a touch or non-touch operation of a user on or around the touch panel 142 (for example, an operation performed on or around the touch panel 142 by a user by using a finger or any proper object or accessory such as a stylus, where the operation may include a motion sensing operation, and the operation includes operation types such as a single-point control operation and a multi-point control operation), and drives a corresponding connection apparatus according to a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and then sends the information to the processor 180, and can receive a command sent by the processor 180 and execute the command. In addition, the touch panel 142 may be implemented in a plurality of types such as a resistive type, a capacitive type, an infrared type, and a surface acoustic wave type; or the touch panel 142 may be implemented by using any technology to be developed in the future. Further, the touch panel 142 may cover the display panel 141. The user may perform, according to content displayed on the display panel 141 (where the displayed content includes but is not limited to a soft keyboard, a virtual mouse, a virtual key, an icon, or the like), an operation on or near the touch panel 142 covering the display panel 141. After detecting the touch operation on or near the touch panel 142, the touch panel 142 transfers the touch operation to the processor 180 to determine a type of a touch event, to determine a user input. Subsequently, the processor 180 provides a corresponding visual output on the display panel 141 according to the type of the touch event. Although in FIG. 2, the touch panel 142 and the display panel 141 are used as two independent components to implement input and output functions of the mobile phone 100, in some embodiments, the touch panel 142 and the display panel 141 may be integrated to implement the input and output functions of the mobile phone 100.

The mobile phone 100 may further include at least one sensor 150, such as a light sensor or a motion sensor, and may further include a sensor, a sensor hub (sensor hub), and another sensor. For example, the optical sensor may include an ambient light sensor and a proximity sensor. The ambient light sensor may adjust luminance of the display panel 141 based on brightness of an ambient light. The proximity sensor may switch off the display panel 141 and/or backlight when the mobile phone 100 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 100. Details are not described herein.

The interruption controller 160 may receive an interruption signal from another module or component in the mobile phone 100, and the interruption signal may be used to trigger some modules of the mobile phone 100 to switch from a sleep state to a normal working state. The interruption controller 160 may send various interruption signals to the AP. If the AP is in the sleep state, the AP receives the interruption signal sent by the interruption controller 160, the AP may enter the normal working state from the sleep state, and the AP may store a moment of wake-up (the time may be referred to as an AP wake-up moment, which is not specifically limited herein) in a wake-up record. It may be understood that the moment at which the AP receives the current interruption signal and the AP wake-up moment may be the same or have an error range. Alternatively, the AP may mark the moment at which the AP receives the current interruption signal as the current AP wake-up time. This is not specifically limited herein. The wake-up record may always store a latest AP wake-up moment, or the AP may store an interruption signal type corresponding to the AP wake-up moment in the wake-up record, where the interruption signal type indicates a module that sends the interruption signal. For example, the interruption signal is sent by the RTC module 130, or the interruption signal is sent by the RF circuit 110. It may be understood that the interruption controller 160 may exist independently, or may be integrated into a power supply chip of the power supply 190. This is not specifically limited herein.

The mobile phone 100 may further include an audio circuit, a loudspeaker, and a microphone. The audio circuit may convert received audio data into a signal and transmit the signal to the speaker. The speaker converts the signal into a sound signal for output. On the other hand, the microphone converts a collected sound signal into a signal. The audio circuit receives the signal and converts the signal into audio data, and outputs the audio data to the RF circuit to send the audio data to, for example, another mobile phone, or outputs the audio data to the memory 120 for further processing.

Wi-Fi belongs to a short-range wireless transmission technology. The mobile phone 100 may help, by using the Wi-Fi module 170, the user to receive and send an email, browse a web page, access streaming media, and the like. The Wi-Fi module 170 provides wireless broadband Internet access for the user. Although FIG. 2 shows the Wi-Fi module 170, it may be understood that the Wi-Fi module 170 is not a necessary component of the mobile phone 100.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. Optionally, the processor 180 may include one or more processing units. Preferably, the processor 180 may integrate an AP, a communication processor (CP), and a modem processor. The AP mainly processes an operating system, a user interface, an application program, and the like. The CP may also be referred to as a baseband processor (BP), and mainly processes wireless communication, for example, the CP is responsible for managing all video services that require an antenna, and the modem processor mainly processes wireless communication. It may be understood that, the foregoing CP (BP) and modem processor may alternatively not be integrated into the processor 180.

The mobile phone 100 further includes the power supply 190 (such as a battery) supplying power to the components. The power supply 190 may include a power supply chip. Preferably, the power supply may be logically connected to the processor 180 by using a power supply management system, to implement functions such as management of charging, discharging, and energy consumption by using the power supply management system.

The mobile phone 100 may further include a camera, a Bluetooth module, and the like although they are not shown. Details are not described herein.

Sleep State and Normal Working State

A status of the terminal device may include a sleep state and a normal working state. In the normal working state, the terminal device is in a high power mode. When the terminal device is in the sleep state, power of some internal components (for example, a power supply chip, a modem processor, a Wi-Fi module, a BP, an RF circuit, a sensor hub, or a display screen) of the terminal device is reduced, and the terminal device enters a low power mode. The terminal device may execute a sleep algorithm when the terminal device is in a normal working state to determine whether the terminal device meets a sleep condition. If the terminal device meets the sleep condition, the terminal device enters a sleep state. The algorithm is responsible for determining a moment of entering a low power mode. For example, the terminal device determines, every 100 ms, whether a module or a component in the system holds a lock that rejects sleep, and if no module or component holds a lock that rejects sleep, the terminal device enters a sleep state. It may be understood that the foregoing example is merely used to better describe the sleep algorithm and the sleep condition, and does not limit the sleep algorithm and the sleep condition. In an implementation, when the terminal device enters the sleep state, the AP enters the sleep state, and the display screen is turned off (the display screen may be powered off, or may be in the sleep state without being powered off).

Interruption Signal and Wake-Up

Figure 3A:
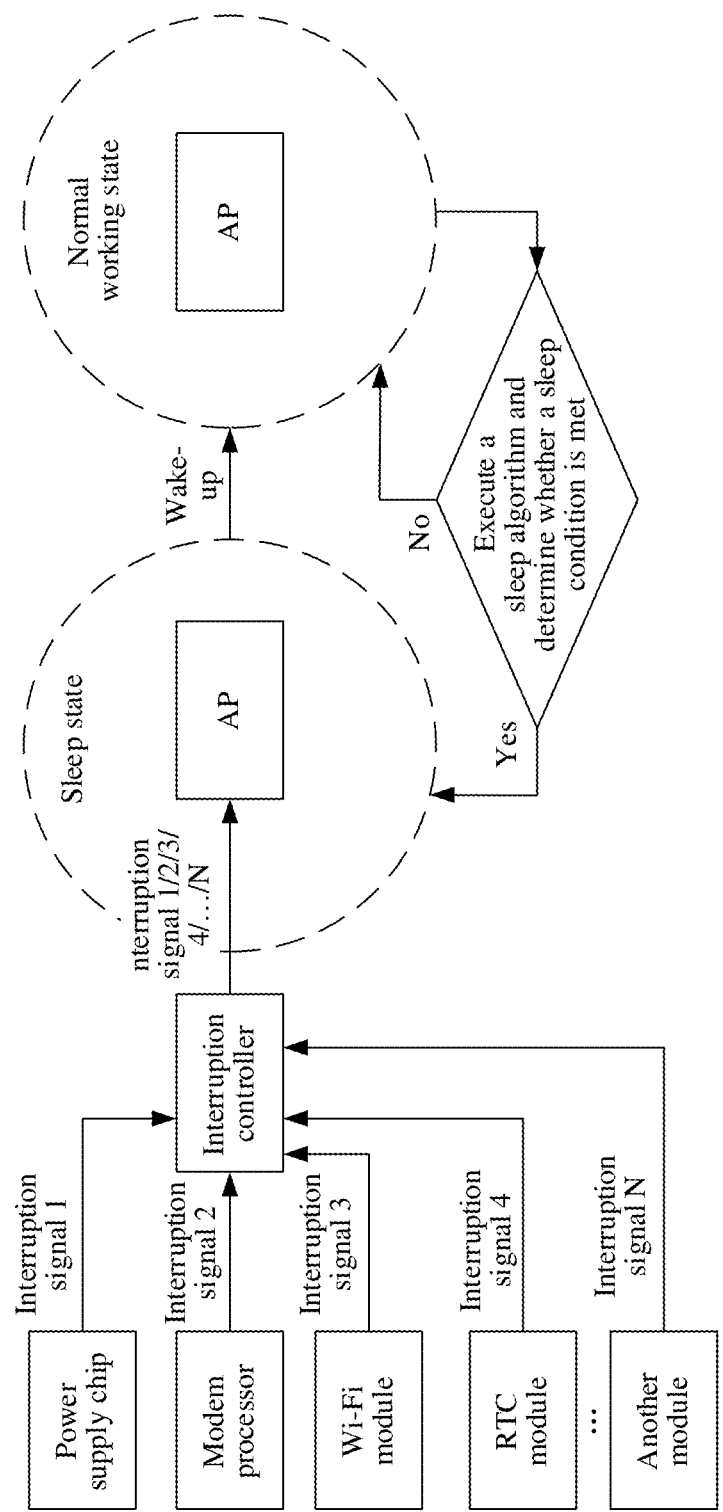
FIG. 3a is a schematic diagram of a state switching process of a terminal device according to an embodiment of this disclosure.

Referring to FIG. 3a, some modules of the terminal device send an interruption signal under a specific condition. For example, a Wi-Fi module receives a signal and sends an interruption signal, an RF circuit receives data and sends an interruption signal, a BP receives a signal and sends an interruption signal, and a modem processor receives data and sends an interruption signal. Similarly, another module such as a power supply chip or a sensor (such as a sensor hub) receives a signal or data and sends an interruption signal. This is not specifically limited herein. When timing of an RTC module reaches an RTC moment, the RTC module sends an interruption signal.

When the terminal device is in the normal working state, the terminal device executes the sleep algorithm to determine whether a sleep condition is met. If the sleep condition is met, the terminal device enters the sleep state, and the AP and some modules enter the sleep state. When the AP is in the sleep state, if an interruption controller receives an interruption signal, the interruption controller may send the interruption signal to the AP, to trigger the AP to enter the normal working state, so that the AP is woken up, and the terminal device performs wake-up. The interruption signal may be an interruption signal 1 sent by the power supply chip, an interruption signal 2 sent by the modem processor, an interruption signal 3 sent by the Wi-Fi module, an interruption signal 4 sent by the RTC module, or an interruption signal N sent by another module, which is not specifically limited herein. For example, when the AP receives an incoming call in the sleep state, the modem processor sends an interruption signal, and after receiving the interruption signal, the interruption controller triggers the AP to enter the normal working state from the sleep state. For another example, when the AP is in the sleep state, a power button is pressed, or the USB cable is connected/disconnected to the power supply, the power supply chip sends the interruption signal, and after receiving the interruption signal, the interruption controller triggers the AP to enter the normal working state from the sleep state. For yet another example, the sensor hub may send an interruption signal at a fixed interval (for example, every 30 minutes), and if the AP is in the sleep state, after receiving the interruption signal, the interruption controller triggers the AP to enter the normal working state from the sleep state. For still another example, when timing of the RTC module reaches the RTC moment, the RTC module sends an interruption signal, and after receiving the interruption signal, if the AP is in the sleep state, the interruption controller triggers the AP to enter the normal working state from the sleep state. The AP converts the interruption instruction sent by the RTC module into an RTC interruption instruction and executes the RTC distribution module, and the RTC distribution module distributes the RTC interruption instruction to a corresponding software module in which the RTC moment is set.

Figure 3B:
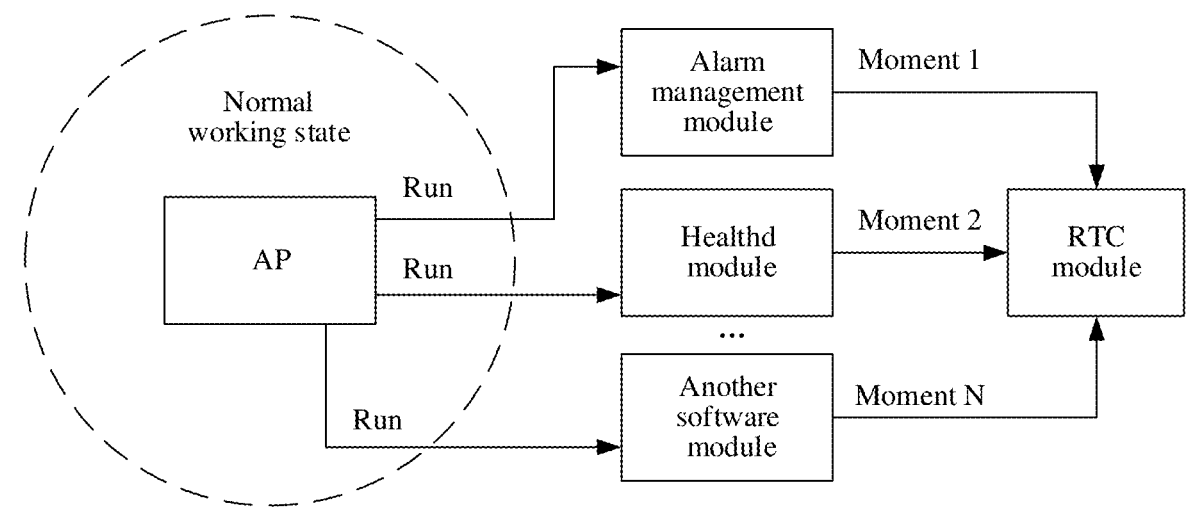
FIG. 3b is a schematic diagram of a process in which an AP sets an RTC moment according to an embodiment of this disclosure.

Referring to FIG. 3b, in the normal working state, the AP may run the alarm management module to set a moment to be written into the register of the RTC module, and the AP writes the specified moment into the register of the RTC module. The moment becomes an RTC moment. In other words, the alarm management module sets the RTC moment.

In the normal working state, the AP may run the Healthd module to set the moment to be written into the register of the RTC module, and the AP writes the specified moment into the register of the RTC module. The moment becomes the RTC moment. In other words, the Healthd module sets the RTC moment.

It may be understood that, in the normal working state, the AP may further run another software module to set the moment to be written into the register of the RTC module, and write the moment set by the software module into the register of the RTC module. In other words, the another software module sets the RTC moment. This is not specifically limited herein.

In the normal working state, the AP can write the moment 1 set by running the alarm management module, the moment 2 set by running the Healthd module, or the moment N set by running the another other software module into the RTC module as the RTC moment.

Figure 3C:
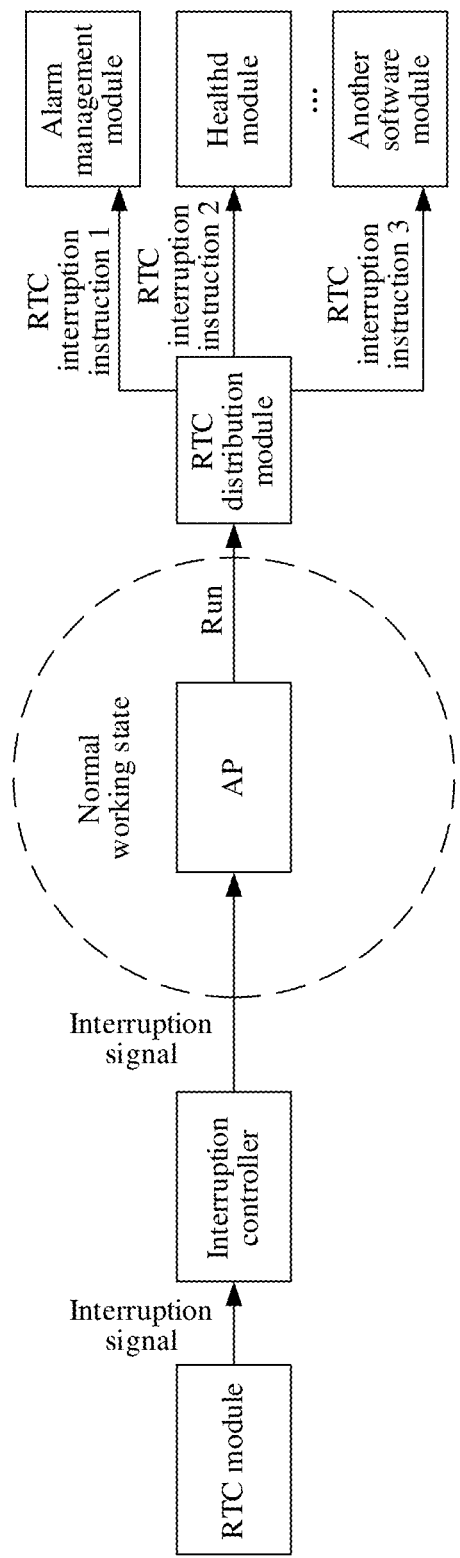
FIG. 3c is a schematic diagram of a process in which an RTC distribution module distributes an RTC interruption instruction according to an embodiment of this disclosure.

Referring to FIG. 3c, if the AP receives the interruption signal sent by the RTC module and the AP is in the normal working state (it may be understood that, after receiving the interruption signal sent by the RTC module, the AP may enter the normal working state from the sleep state, or the AP may be in the normal working state when receiving the interruption signal sent by the RTC module), after the AP determines that the interruption signal is sent by the RTC module, the AP may run the RTC distribution module, and may convert the interruption signal sent by the RTC module into an RTC interruption instruction, where the RTC interruption instruction includes an the RTC interruption instruction distribution moment, and the RTC interruption instruction distribution moment may be a moment at which the RTC distribution module distributes the RTC interruption instruction. It may be understood that the distribution moment of the RTC interruption instruction and an RTC moment at which the RTC module sends the current interruption signal are the same or have an error range. The AP runs the RTC distribution module to perform: distributing the RTC interruption instruction to a corresponding software module according to a record, where the moment set by the corresponding software module and written into the register of the RTC module is an RTC moment at which the RTC module sends the interruption signal, and the corresponding software module may be the alarm management module, the Healthd module, or another software module.

In a possible implementation, when the AP writes, in the normal working state, the moment set by the alarm management module, the Healthd module, or the another software module into the register of the RTC module, and the moment becomes the RTC moment, the AP may store, in the RTC distribution module, the RTC moment and an identifier of the corresponding software module that sets the moment. When the AP receives the interruption signal sent by the RTC module and the AP executes the RTC distribution module in the normal working state (the AP may enter the normal working state from the sleep state after receiving the interruption signal sent by the RTC module, or the AP may be in the normal working state when receiving the interruption signal sent by the RTC module), the RTC distribution module may compare, based on a current moment, the RTC moment with the identifier of the corresponding software module that are stored in the RTC distribution module, and determine to distribute the RTC interruption instruction to the corresponding software module. It may be understood that, the foregoing provides an example of the record. The record may be the RTC moment stored by the RTC distribution module and the identifier of the corresponding software module that sets the moment. The record may also be other content. This is not specifically limited herein.

Alarm Wake-Up and Non-Alarm Wake-Up

Referring to the foregoing description of the process of setting the RTC moment, when the alarm management module sets the RTC moment, and timing of the RTC module reaches the RTC moment, the RTC module sends an interruption signal, and after receiving the interruption signal, the interruption controller triggers the AP to enter the normal working state from the sleep state. This process may be referred to as alarm wake-up. The terminal device performs the alarm wake-up, and the interruption signal is an alarm wake-up interruption signal. When the Healthd module and another software module than the alarm management module set the RTC moment, and timing of the RTC module reaches the RTC moment, the RTC module sends an interruption signal. After receiving the interruption signal, the interruption controller triggers the AP to enter the normal working state from the sleep state. This process may be referred to as non-alarm wake-up. The terminal device performs the non-alarm wake-up, and the interruption signal is a non-alarm wake-up interruption signal. In addition, for an interruption signal sent by another module that is not the RTC module, after receiving the interruption signal, the interruption controller triggers the AP to enter a normal working state from a sleep state. This process may also be referred to as non-alarm wake-up. The terminal device performs non-alarm wake-up, and the interruption signal is a non-alarm wake-up interruption signal. It may be understood that wake-up other than alarm wake-up may be referred to as non-alarm wake-up. For example, the sensor hub sends an interruption signal, and after receiving the interruption signal, the interruption controller triggers, if the AP is in a sleep state, the AP to enter a normal working state from the sleep state. For another example, when the terminal device in the sleep state receives an incoming call, the modem processor sends an interruption signal, and after receiving the interruption signal, the interruption controller triggers the AP to enter the normal working state from the sleep state. For yet another example, when the terminal device is in the sleep state, and a power button is pressed, the power supply chip sends an interruption signal, and after receiving the interruption signal, the interruption controller triggers the AP to enter the normal working state from the sleep state. This is not specifically limited herein.

Alarm Timer and Alarm Timer Triggering

To implement wake-up performed by the terminal device at a specified moment, the AP is woken up at a specified moment to enable the AP to enter the normal working state from the sleep state, the AP may be implemented by running an application to register and set a timer, where the timer may correspond to an operation related to the application, and is used to instruct the terminal device to perform the operation related to the application at a specified moment. In the following embodiments, an alarm timer is used as an example for description. A specific implementation of the timer is not limited in the present invention.

The timer is defined on an application layer. When in the normal working state, the AP can run the alarm management module to manage the timer, including setting, deleting, and modifying the timer. In an Android™ system, the alarm management module may be an AlarmManager, or may have another name. This is not specifically limited herein. The timer may be an alarm timer, or may have another name. This is not specifically limited herein. In a subsequent embodiment, only an example is used as for description in which the AlarmManager is used as the alarm management module and the alarm timer is used as the timer.

Figure 4:
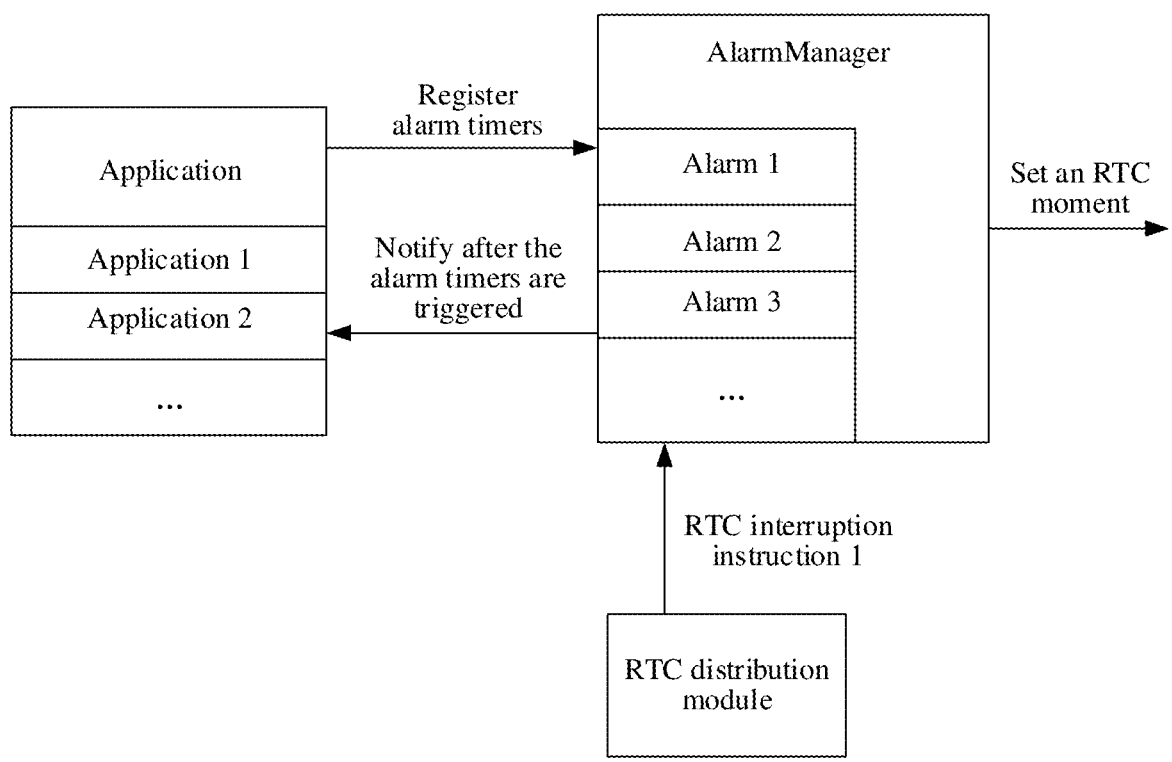
FIG. 4 is a schematic diagram of an alarm timer triggering process according to an embodiment of this disclosure.

Referring to FIG. 4, when the AP is in the normal working state, the AP runs a system application or an installed third-party application, and runs the AlarmManager to perform: registering an alarm timer corresponding to an operation related to the application, and setting, according to an application situation or a user selection, information such as an earliest available triggering moment of the alarm timer, whether an offset window is supported and an offset window size existing when the offset window is supported, and whether wake-up is supported. It may be understood that one application may register one alarm timer, or may register a plurality of alarm timers. This is not specifically limited herein. The application may be an alarm clock application, a memo application, WeChat, Evernote, or the like. This is not specifically limited herein. The operation related to the application may be scanning for a virus, ringing, sending a message, or the like. This is not specifically limited herein.

When the AP is in the normal working state, the AP runs the AlarmManager to perform: determining a fixed triggering moment of an alarm timer that is currently registered and set, setting a fixed triggering moment (the fixed triggering moment may be a fixed triggering moment of one alarm timer, or may be a fixed moment of a plurality of alarm timers, and fixed triggering moments of the plurality of alarm timers are the same, which is not specifically limited herein) as a moment to be written into the register of the RTC module. The AP writes the fixed triggering moment into the register of the RTC module as the RTC moment.

When timing of the RTC module reaches the RTC moment, that is, when the fixed triggering moment is reached, the RTC module sends an interruption signal. Referring to the foregoing description of distributing the RTC interruption instruction by the RTC distribution module, the AP in the normal working state runs the AlarmManager to perform: according an RTC interruption instruction distribution moment in the RTC interruption instruction, determining an alarm timer corresponding to the fixed triggering moment and triggering the alarm timer; instructing the AP to perform an operation corresponding to an application that registers the alarm timer, which may be referred to as notifying the application that registers the alarm timer, to enable the application to perform the corresponding operation, for example, enable the alarm clock application to send a reminder, the memo application to send a reminder message, the application to scan for a virus, or the application to send a heartbeat packet to a server; and deleting the triggered alarm timer. Referring to the foregoing description of the process in which the RTC module deletes the RTC moment, the RTC moment is deleted.

It may be understood that, referring to the foregoing description of the process of setting a fixed triggering moment as the RTC moment, after a fixed triggering moment of an alarm timer is set as the RTC moment, if the alarm timer is deleted, correspondingly, the RTC module may delete the RTC moment.

If the alarm timer supports the offset window, the alarm timer is a non-precise alarm timer. The offset window size defines maximum duration for delaying triggering the alarm timer. A moment obtained by adding the offset window to the earliest available triggering moment of the alarm timer is a latest available triggering moment of the alarm timer. A time range from the earliest available triggering moment to the latest available triggering moment is a triggering time range of the alarm timer, where the earliest available triggering moment is an earliest moment in the triggering time range, and the latest available triggering moment is a latest moment in the triggering time range. The alarm timer may be triggered at a specified moment, and the specified moment may be referred to as a fixed triggering moment of the alarm timer, where the fixed triggering moment of the alarm timer may be any moment in the triggering time range of the alarm timer. For example, an earliest available triggering moment of a non-precise alarm timer is 8:00 on Feb. 5, 2018, and an offset window is 1 hour. In this case, the alarm timer may be triggered at any specified moment from 8:00 to 9:00 on Feb. 5, 2018. That is, the fixed triggering moment of the alarm timer may be any moment from 8:00 to 9:00 on Feb. 5, 2018, where 8:00 on Feb. 5, 2018 is the earliest available triggering moment of the alarm timer, and 9:00 on Feb. 5, 2018 is the latest available triggering moment of the alarm timer. When the alarm timer does not support the offset window, the alarm timer is a precise alarm timer. An earliest available triggering moment and a latest available triggering moment of the precise alarm timer are the same. The precise alarm timer does not have a triggering time range, and a fixed triggering moment of the precise alarm timer is the earliest available triggering moment of this alarm timer. For example, an earliest available triggering moment of a precise alarm timer is 8:00 on Feb. 5, 2018, and the offset window is not supported. In this case, the alarm timer can be triggered only at 8:00 on Feb. 5, 2018. That is, the fixed triggering moment of the alarm timer is 8:00 on Feb. 5, 2018.

When the alarm timer supports wake-up, the AP in the normal working state may run the AlarmManager to set the fixed triggering moment of the alarm timer as the RTC moment. When timing of the RTC module reaches the RTC moment, that is, the fixed triggering moment of the alarm timer supporting wake-up is reached, the AP in the sleep state can be woken up.

When the alarm timer does not support wake-up, that is, the alarm timer is an alarm timer that cannot be woken up, the fixed triggering moment of the alarm timer that cannot be woken up may not be set as the RTC moment. Optionally, the fixed triggering moment of the alarm timer that cannot be woken up may also be set as the RTC moment, but when the fixed moment of the alarm timer that cannot be woken up is reached, the RTC module may not send an interruption signal. This is not specifically limited herein as long as it is ensured that the alarm timer that cannot be woken up cannot enable the AP to enter the normal working state from the sleep state.

Alarm List and Setting an RTC Moment by an Alarm Management Module

The AlarmManager can maintain an alarm list, to store all alarm timers that are currently registered and set, and to record information about all the alarm timers that are currently registered and set. The information may include an earliest available triggering moment of the alarm timer, whether an offset window is supported and an offset window size existing when the offset window is supported, whether wake-up or a fixed triggering moment is supported, or the like. It may be understood that, the alarm list is changeable, and management of the alarm list may be implemented by running the AlarmManager by the AP in the normal working state. For example, when the AP runs an application to deregister the alarm timer or the alarm timer is triggered, information about the alarm timer may be deleted from the alarm list. For example, a new alarm timer is registered. For another example, the available triggering moment or the fixed triggering moment of the originally registered alarm timer is adjusted. This is not specifically limited herein. It may be understood that the alarm list may be in a form of a table, or may be in a form of a linked list, which is not specifically limited herein. Alternatively, all the alarm timers that are currently registered and set are not stored in a form of an alarm list, but are stored in another form. In a subsequent embodiment, only an example in which the alarm list stores all the alarm timers that are currently registered and set is used for description. After the foregoing described process of registering the alarm timer, information such as the earliest available triggering moment of the registered alarm timer, whether the offset window is supported and the offset window size existing when the offset window is supported, and whether wake-up is supported may be stored in the alarm list. After the foregoing described process of determining the fixed triggering moment of the alarm timer, the fixed triggering moment may be stored in the alarm list. After the foregoing described process of deleting the triggered alarm timer, the information about the alarm timer may be deleted from the alarm list.

When the AP is in the normal working state, the AP can run the AlarmManager to perform: grouping all the alarm timers that are currently registered and set. The information about the alarm timers can be stored in the alarm list by group. The grouping may be performed according to a specific algorithm. For example, in the prior art, all current alarm timers are sorted in ascending order of earliest available triggering moments. Starting from an alarm timer of which an earliest available triggering moment is the earliest, non-precise alarm timers that support the offset window and of which triggering time ranges have an intersection set are grouped into one group, and this group may include an alarm timer that supports wake-up and an alarm timer that cannot be woken up, which are not identified. A common intersection set of the triggering time ranges of all the alarm timers in the group is recorded as a triggering time range of the group. Precise alarms that do not support the offset window may form a group. In this way, all alarm timer groups may be obtained, where an alarm timer group may be recorded as a group batch.

It may be understood that, when a case such as deleting the original alarm timer, adding a newly registered alarm timer, or changing the available triggering moment of the original alarm timer occurs, the foregoing described grouping process of the alarm timers may be performed again according to a situation.

In the prior art, when the AP runs the AlarmManager to determine the fixed triggering moment of the non-precise alarm timer in the alarm list, after the foregoing described process of grouping alarm timers, based on a triggering time range of each batch, an earliest moment in the triggering time range of each batch may be used as a batch triggering moment of the batch, and the batch triggering moment of the batch is used as a fixed triggering moment of all alarm timers in the batch. For a batch of precise alarm timers, a batch triggering moment of the batch is a fixed triggering moment of the precise alarm timers. For example, refer to the following alarm list shown in Table 1. It may be understood that Table 1 is merely an example of an alarm list in a group form in the prior art, and does not limit a form and content of the alarm list. A batch, an alarm, an available triggering moment, whether an offset is supported and an offset window size, and a correspondence between whether wake-up is supported and the available triggering moment may not be stored in a list form, but are recorded in another form. This is not limited in the present invention.

It may be understood that, when a batch in the alarm list changes, the foregoing described process of determining the fixed triggering moment of the non-precise alarm timer in the alarm list may be re-executed.

TABLE 1

| Batch | Alarm | Earliest available triggering moment | Whether an offset window is supported/Offset window size | Whether wake-up is supported | Batch triggering moment |
|---|---|---|---|---|---|
| Batch 1 | Alarm A | 3:10 | Yes/12 minutes | No | 3:10 |
|  | Alarm B | 3:10 | Yes/20 minutes | Yes |  |
| Batch 2 | Alarm C | 3:15 AM | Yes/5 minutes | Yes | 3:18 AM |
|  | Alarm D | 3:18 AM | Yes/2 minutes | Yes |  |
|  | ... |  |  |  |  |
| Batch 3 | alarm E | 3:20 AM | No/0 | Yes | 3:20 AM |
| ... | ... | ... | ... | ... |  |

In the prior art, an implementation of the setting a fixed triggering moment as the RTC moment may be as follows: After the foregoing described process of determining the fixed triggering moment of the non-precise alarm timer in the alarm list when the alarm timers are grouped, the current batch triggering moments (including the batch triggering moment of the precise batch and the batch triggering moment of the non-precise batch) may be sorted in ascending order, and a current earliest batch triggering moment is set as the RTC moment. Referring to the foregoing description of the process of triggering the alarm timer of which the fixed triggering moment is set as the RTC moment, when timing of the RTC module reaches the RTC moment, all alarm timers in the batch corresponding to the earliest batch triggering moment are triggered, a corresponding application is notified and performs a corresponding operation, and all the alarm timers in the batch corresponding to the earliest batch triggering moment are deleted from the alarm list. Referring to the foregoing description of the process in which the RTC module deletes the RTC moment, the RTC moment is deleted.

Similarly, with reference to the foregoing described implementation of setting a fixed triggering moment as the RTC moment, a new round of setting a fixed triggering moment as the RTC moment may be performed. After the foregoing deleting the batch corresponding to the earliest batch triggering moment, a batch triggering moment following the earliest batch triggering moment can become a new earliest batch triggering moment, and the new earliest batch triggering moment may be set as the RTC moment.

Optionally, the foregoing described process of grouping the alarm timers may not be performed. In a case in which the alarm timers are not grouped, in the prior art, a process of determining the fixed triggering moment of the non-precise alarm timer in the alarm list may alternatively be as follows: The earliest available triggering moment of each alarm timer may be used as the fixed triggering moment of the alarm timer.

In the prior art, another implementation of the foregoing setting a fixed triggering moment as the RTC moment may be as follows: After the foregoing described process of determining the fixed triggering moment of the non-precise alarm timer in the alarm list when the alarm timers are not grouped, the current fixed triggering moments (including the fixed triggering moment of the precise alarm timer and the fixed triggering moment of the non-precise alarm timer) may be sorted in ascending order, and a current earliest fixed triggering moment is set as the RTC moment. Referring to the foregoing description of the process of triggering the alarm timer of which the fixed triggering moment is set as the RTC moment, when timing of the RTC module reaches the RTC moment, an alarm timer corresponding to the earliest fixed triggering moment is triggered, a corresponding application is notified and performs a corresponding operation, and the alarm timer corresponding to the earliest fixed triggering moment is deleted from the alarm list. Referring to the foregoing description of the process in which the RTC module deletes the RTC moment, the RTC moment is deleted.

Figure 5A:
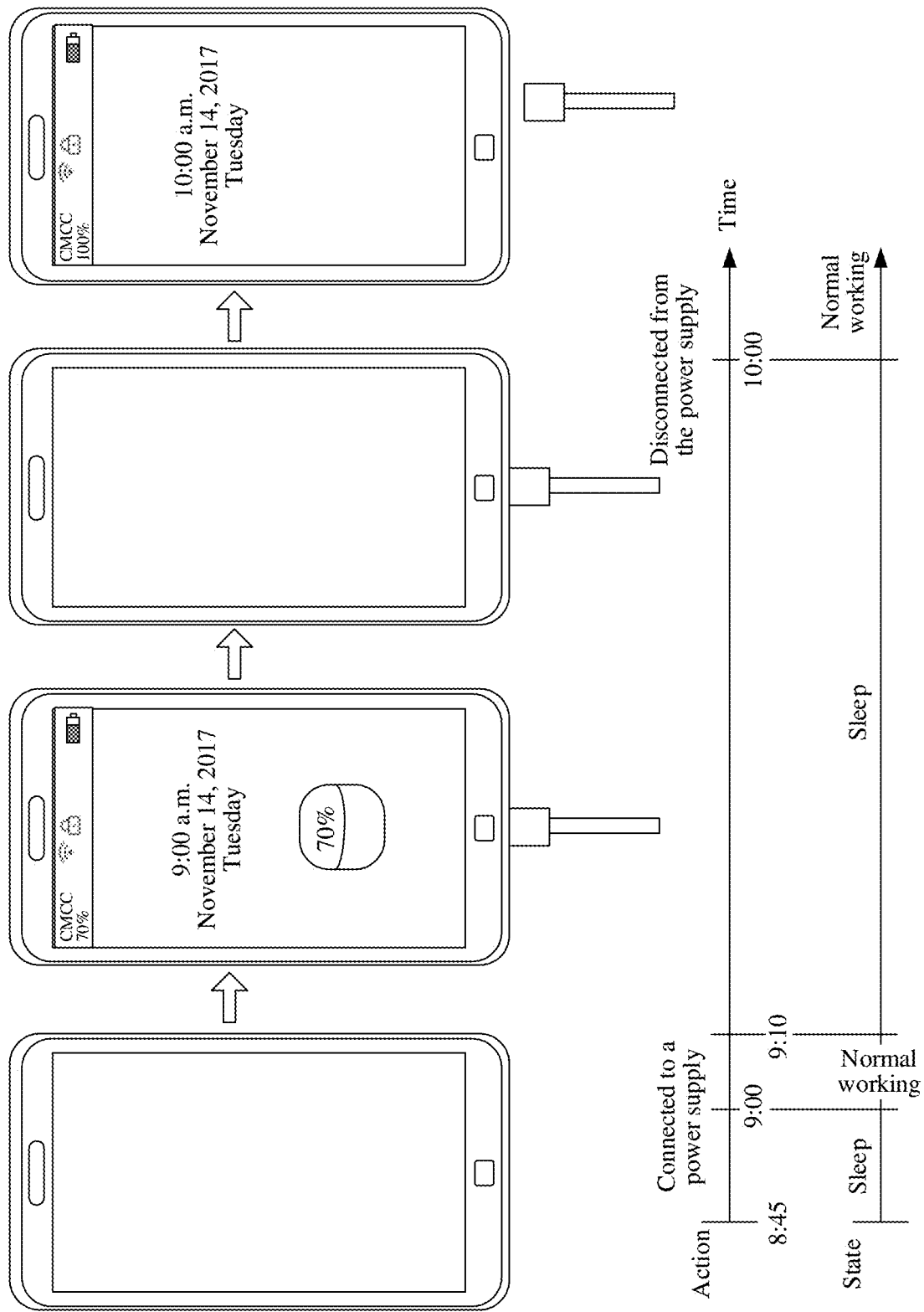
FIG. 5a is a schematic diagram of an application scenario according to an embodiment of this disclosure.

FIG. 5a is a schematic diagram of an application scenario according to an embodiment of this disclosure. When in a normal working state, an AP executes a sleep algorithm, and determines to enter a sleep state when a sleep condition is met at 8:45 a.m. The AP enters the sleep state, and a display screen is turned off. At 9:00 a.m., when a power supply port is connected to a USB cable, a power supply chip sends an interruption signal. After receiving the interruption signal, an interruption controller triggers the AP to enter the normal working state from the sleep state, and the display screen is turned on. The AP further determines to enter a sleep state again at 9:10 a.m. when the sleep condition is met, and the display screen is turned off. At 10:00 a.m., when the USB connection to the power supply port is released, the power supply chip sends an interruption signal again. After receiving the interruption signal, the interruption controller triggers the AP to enter the normal working state from the sleep state, and the display screen is turned on.

Figure 5B:
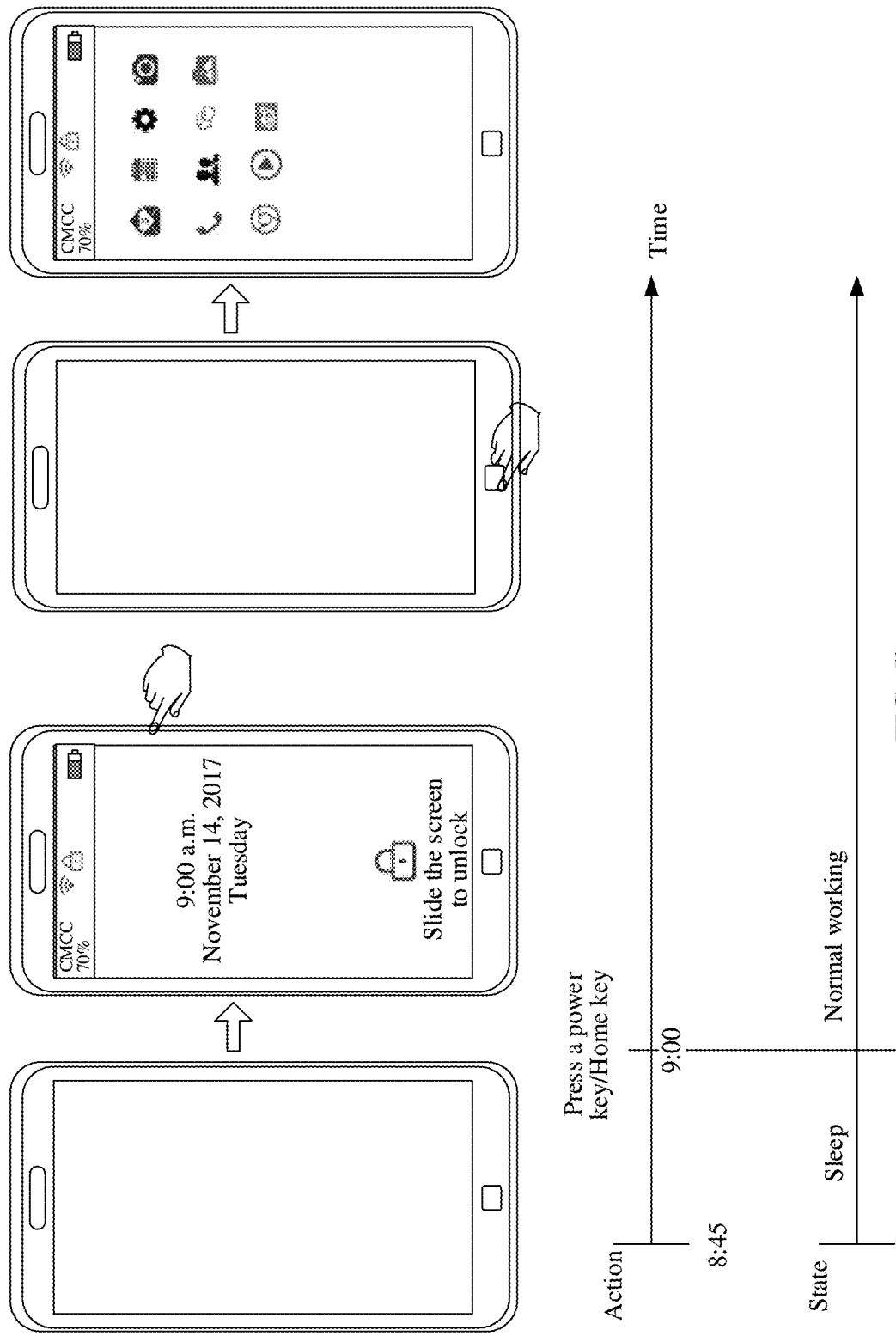
FIG. 5b is a schematic diagram of another application scenario according to an embodiment of this disclosure.

FIG. 5b is a schematic diagram of another application scenario according to an embodiment of this disclosure. In the left half part shown in FIG. 5b, when in a normal working state, an AP determines to enter a sleep state when the sleep condition is met at 8:45 a.m., and a display screen is turned off. At 9:00 a.m., when a user presses a power button, a power supply chip sends an interruption signal. After receiving the interruption signal, an interruption controller triggers the AP to enter the normal working state from the sleep state, and the display screen is turned on. In the right half part shown in FIG. 5b, when a sleep condition is met at 8:45 a.m., the AP enters the sleep state, and the display screen is turned off. At 9:00 a.m., when the user presses a Home key, the power supply chip or the display screen sends an interruption signal. After receiving the interruption signal, the interruption controller triggers the AP to enter the normal working state from the sleep state, and the display screen is turned on.

Figure 5C:
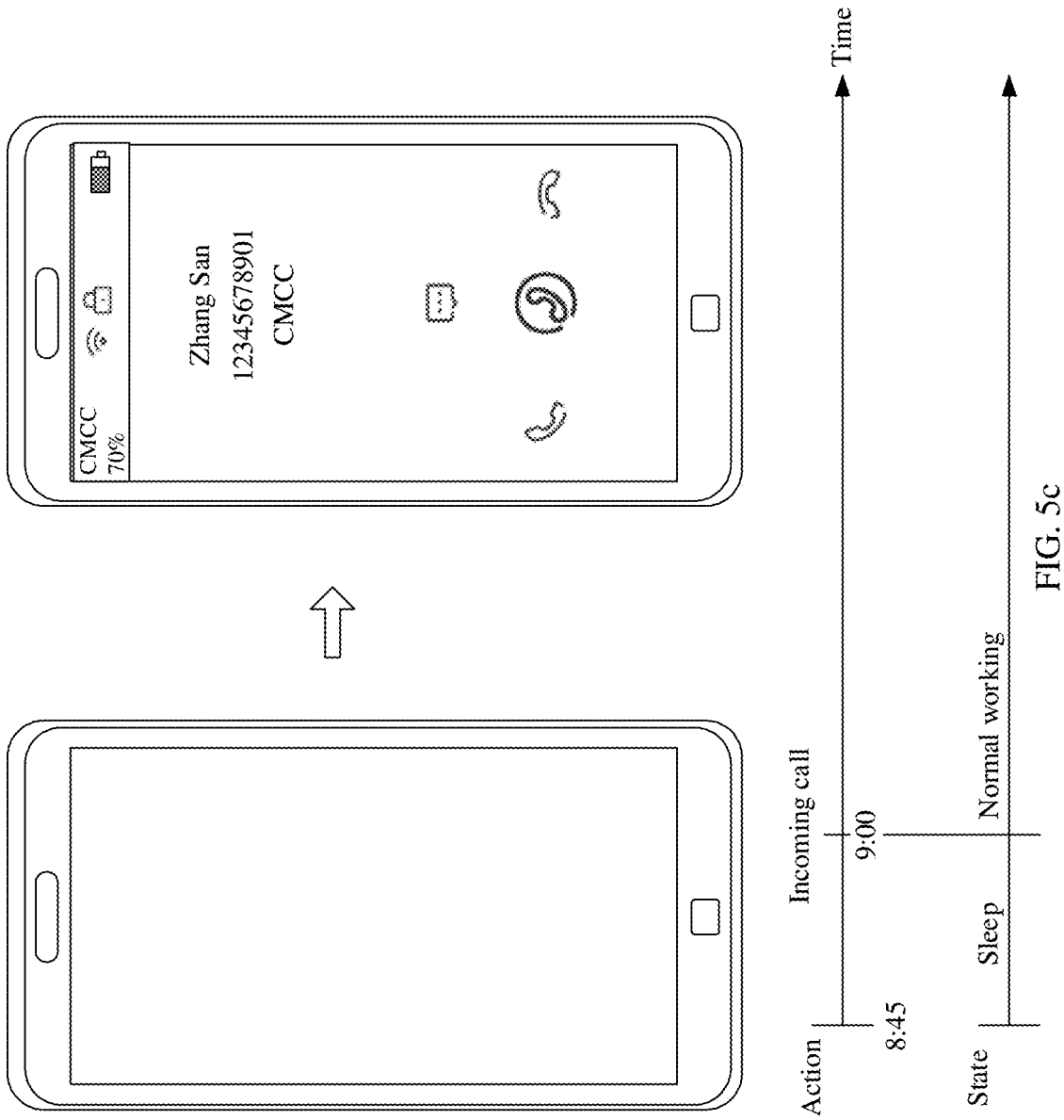
FIG. 5c is a schematic diagram of another application scenario according to an embodiment of this disclosure.

FIG. 5c is a schematic diagram of another application scenario according to an embodiment of this disclosure. When a sleep condition is met at 8:45 a.m., an AP enters a sleep state. At 9:00 a.m., a modem processor receives data, and the modem processor sends an interruption signal. After receiving the interruption signal, an interruption controller triggers the AP to enter a normal working state from the sleep state, and a display screen is turned on.

FIG. 5a and FIG. 5b are examples in which the power supply chip sends the interruption signal, so that the AP enters the normal working state from the sleep state. FIG. 5c is an example in which the modem processor sends the interruption signal, so that the AP enters the normal working state from the sleep state. All of the examples are examples of non-alarm wake-up. In an actual application, another module, for example, an RTC module, may send an interruption signal, so that the AP enters the normal working state from the sleep state. When timing of the RTC module reaches an RTC moment, the RTC module sends an interruption signal. If the RTC moment is set by the Healthd module and another software module than an alarm management module, when timing of the RTC module reaches the RTC moment, the RTC module sends an interruption signal, so that the AP enters the normal working state from the sleep state. This is also non-alarm wake-up. If the RTC moment is set by the alarm management module, when timing of the RTC module reaches the RTC moment, the RTC module sends an interruption signal, so that the AP enters the normal working state from the sleep state. This is alarm wake-up.

For alarm wake-up, an application that registers an alarm timer may be a system application of the terminal device, or may be a third-party application. The application may be an application that needs to be connected to a server through a network, for example, WeChat, QQ, or Facebook. The server may be a cloud server, or may not be a cloud service. This is not specifically limited herein. Alternatively, the application may be an application that does not need to be connected to the server, for example, an alarm clock or Evernote. This is not specifically limited herein. For details, refer to FIG. 5d-1, FIG. 5d-2, and FIG. 5e.

Figure 5D:
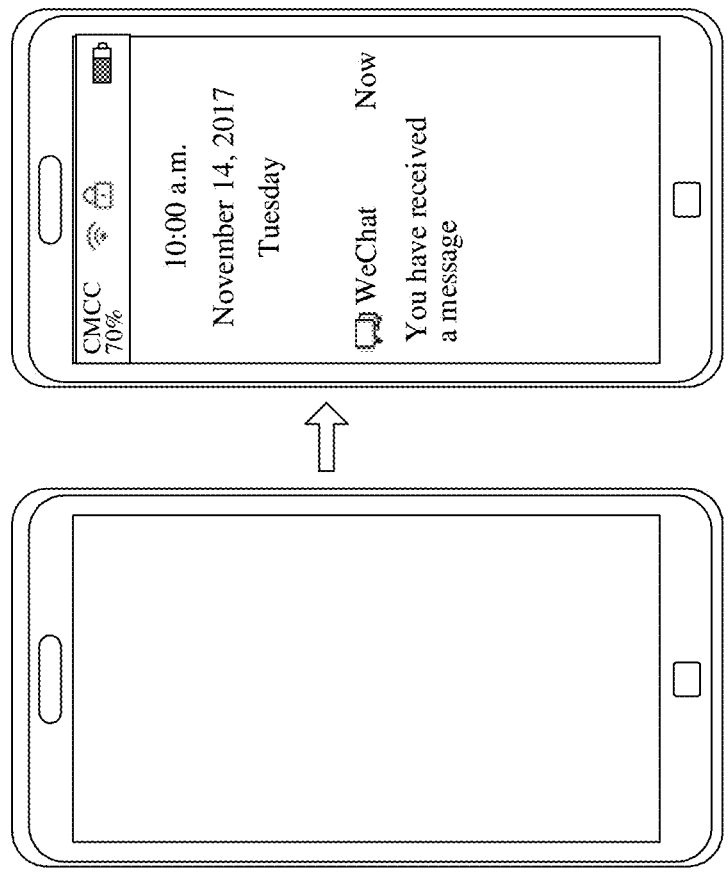
Figure 1:
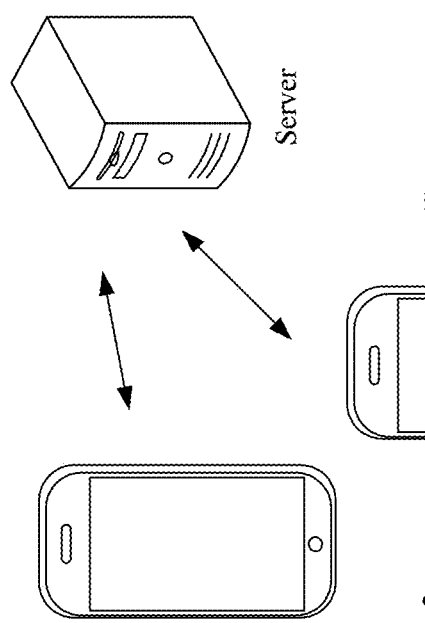
Figure 5D:
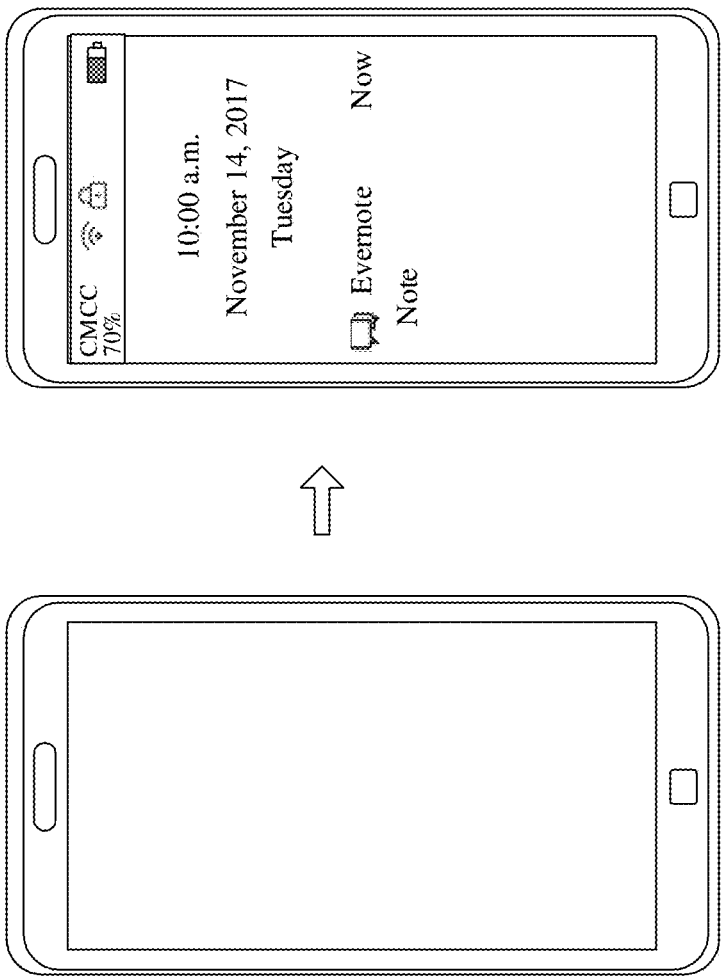
Figure 2:
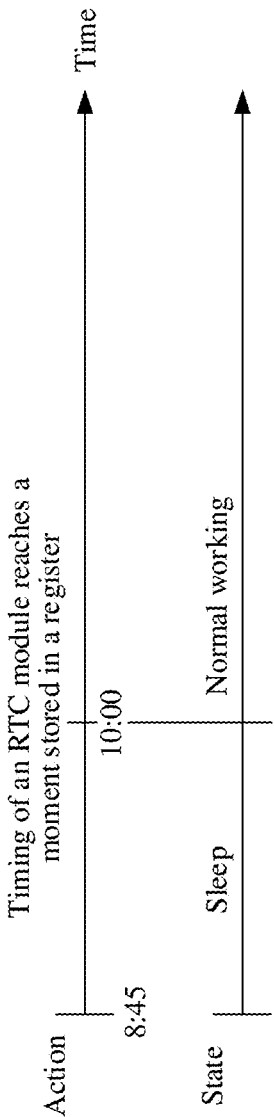

FIG. 5d-1 and FIG. 5d-2 are schematic diagrams of another application scenario according to an embodiment of this disclosure. As shown in FIG. 5d-1, a WeChat application needs to periodically send a heartbeat packet to a server to maintain a persistent connection to ensure that a link is not interrupted, and therefore can receive a message pushed by the server. For example, when the AP is in a normal working state, the WeChat application is run to control an RF circuit to send the heartbeat packet to the server. With reference to the foregoing description of the process of registering the alarm timer corresponding to the operation related to the application, and with reference to the foregoing description of the process of determining the fixed triggering moment of the non-precise alarm timer in the alarm list, the AP registers, in the normal working state, a non-precise alarm timer that supports wake-up and corresponds to the heartbeat packet sent by WeChat to the server, and determines that a fixed triggering moment 1 of an alarm timer 1 is 10:00 a.m. on Nov. 14, 2017. Referring to the foregoing description of the process of setting a fixed triggering moment as the RTC moment, the AP sets the fixed triggering moment 1 of the alarm timer 1 as the RTC moment. At 8:45 a.m., when a sleep condition is met, the AP enters the sleep state and the display screen is turned off. At 10:00 a.m., when timing of the RTC module reaches the RTC moment, the RTC module sends an interruption signal and deletes the RTC moment. After receiving the interruption signal, the interruption controller triggers the AP to enter the normal working state from the sleep state. After the AP enters the normal working state, referring to the foregoing description of the process of triggering the alarm timer of which the fixed triggering moment is set as the RTC moment, the alarm timer 1 is triggered, and the WeChat application is notified and sends the heartbeat packet to the server. When WeChat maintains a persistent connection to the server, the RF circuit receives, right at 10:00, a message pushed by the server, the display screen is turned on, and the received message is displayed on the display screen. In the lower half part shown in FIG. 5*d*-1 and FIG. 5*d*-2, similarly, the AP registers, in the normal working state, a non-precise alarm timer 2 that supports wake-up and that corresponds to a note reminder sent by the Evernote, and determines that a fixed triggering moment 2 of the alarm timer 2 is 10:00 a.m. on Nov. 14, 2017. Similarly, the AP sets the fixed triggering moment 2 of the alarm timer 2 as the RTC moment. At 8:45 a.m., when the sleep condition is met, the AP enters the sleep state and the display screen is turned off. At 10:00 a.m., when timing of the RTC module reaches the RTC moment, similarly, after the AP enters the normal working state, the alarm timer 2 is triggered, the Evernote application is notified and sends the note reminder. The display screen is turned on, and the note reminder is displayed on the display screen.

Figure 5E:
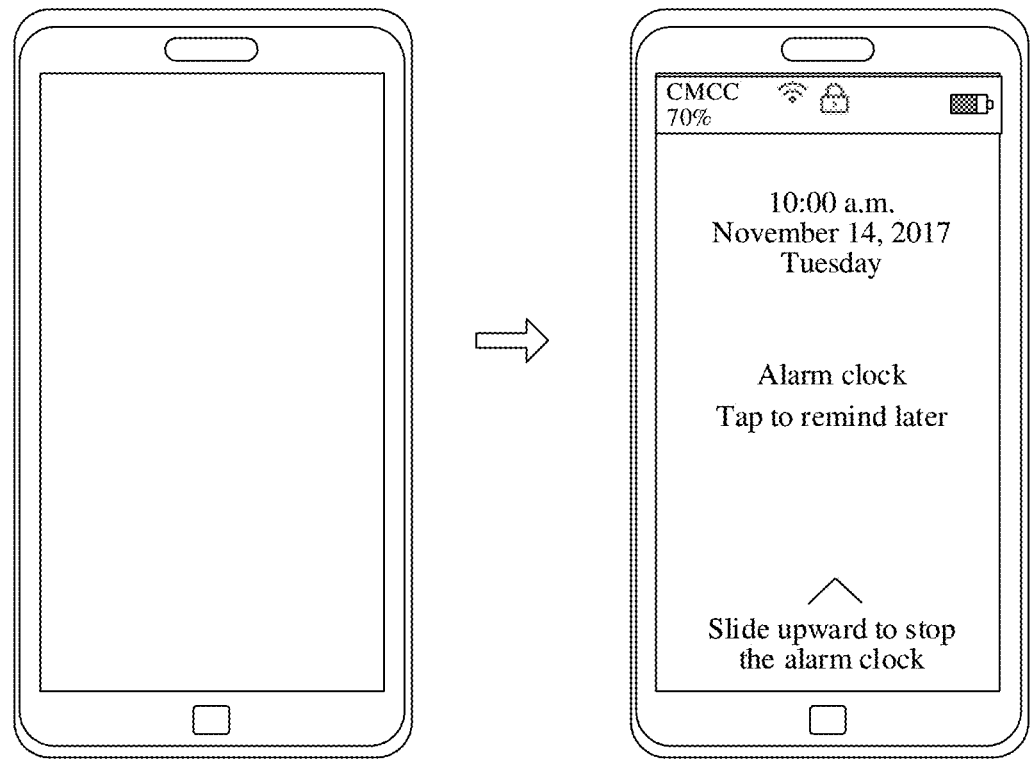
FIG. 5e is a schematic diagram of another application scenario according to an embodiment of this disclosure.
Figure 5E:
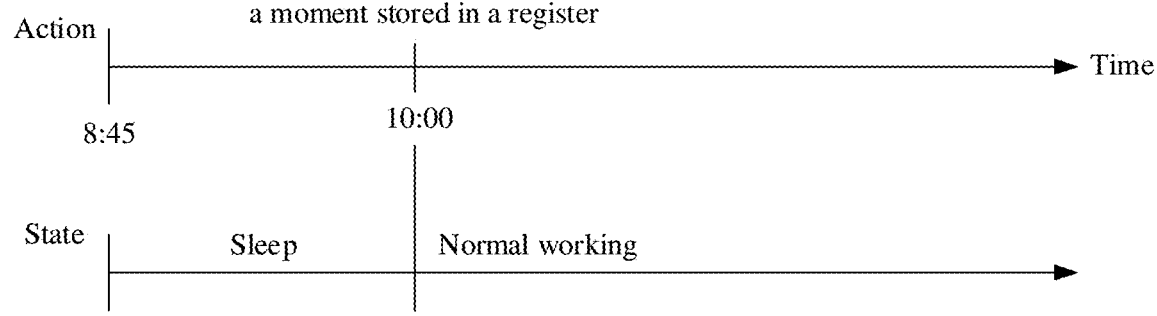

FIG. 5*e* is a schematic diagram of another application scenario according to an embodiment of this disclosure. Similarly, an AP in a normal working state registers a precise alarm timer 3 that supports wake-up and that corresponds to a reminder sent by an alarm clock application, and determines that a fixed triggering moment 3 of the alarm timer 3 is 10:00 a.m. on Nov. 14, 2017. Similarly, the AP sets the fixed triggering moment 3 of the alarm timer 3 as the RTC moment. At 8:45 a.m., when the sleep condition is met and the sleep state is entered, the AP enters the sleep state, and the display screen is turned off. At 10:00 a.m., when timing of the RTC module reaches the RTC moment, similarly, after the AP enters the normal working state, the alarm timer 3 is triggered, the alarm clock application is notified and sends the reminder. The display screen is turned on, the reminder is displayed on the display screen, and a speaker outputs a ring.

In the foregoing schematic diagrams of the application scenarios shown in FIG. 5*a* to FIG. 5*e*, to intuitively reflect that the AP is woken up, after the AP is woken up, the AP controls the display screen to light up. It may be understood that after the AP is woken up, the display screen may not light up and remains in a turned-off state.

Figure 6A:
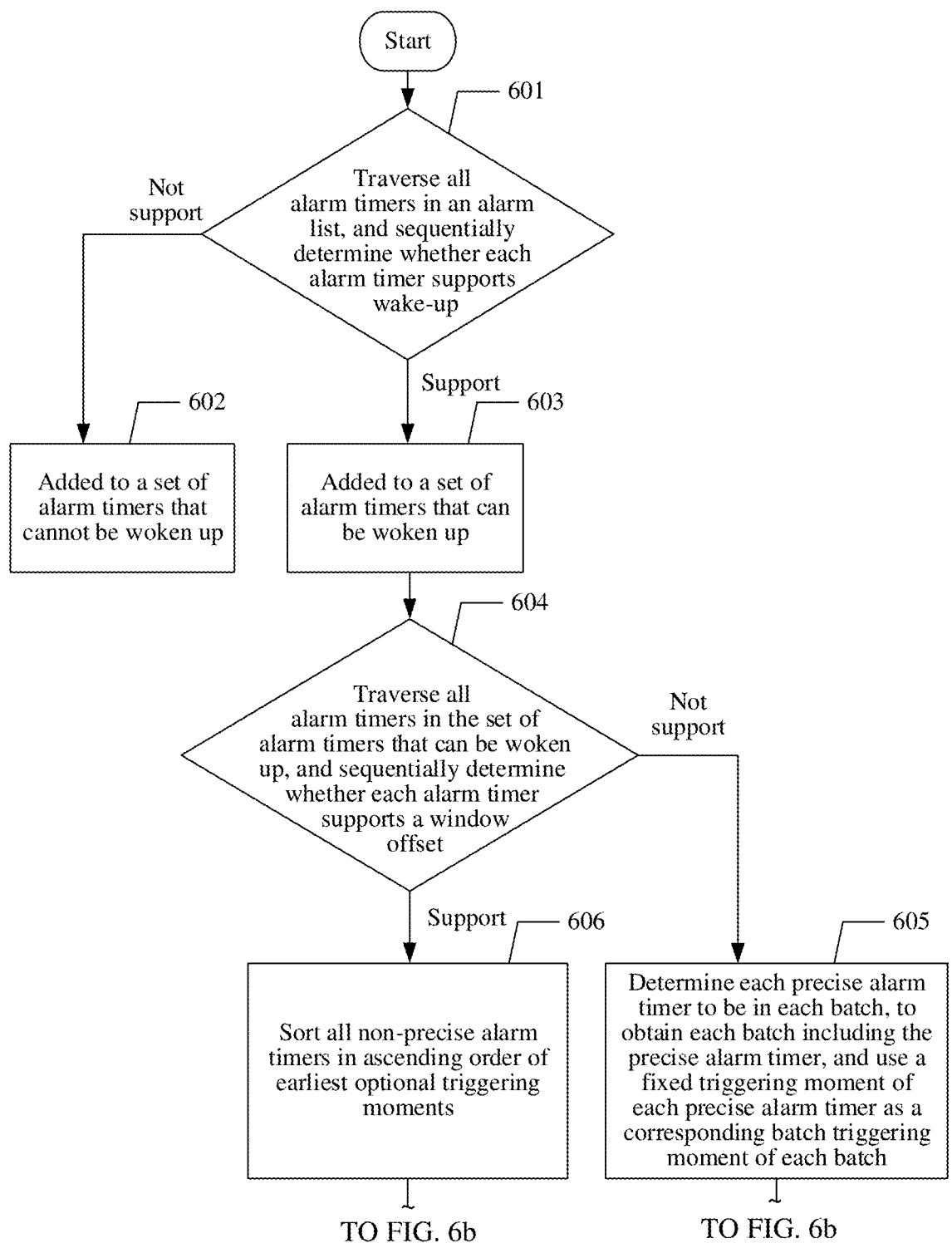
FIG. 6a and FIG. 6b are a flowchart of a wake-up management method according to an embodiment of this disclosure.
Figure 6B:
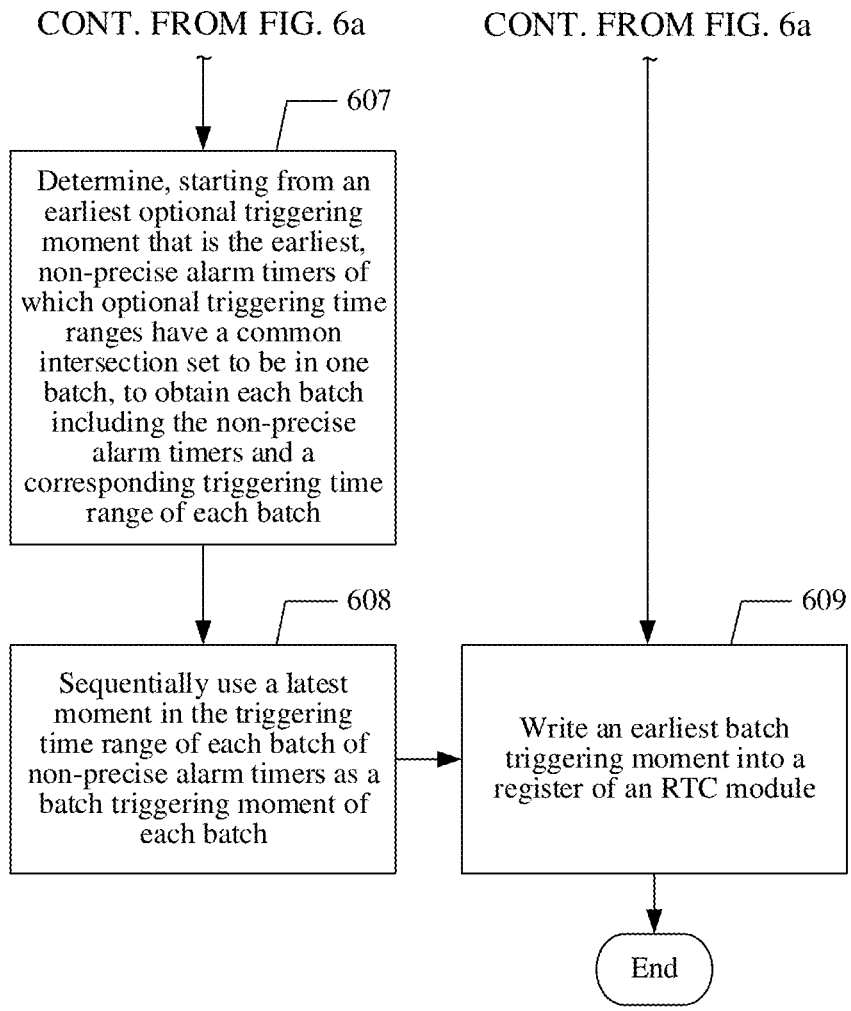

Referring to FIG. 6*a* and FIG. 6*b*, an embodiment of this disclosure provides a wake-up management method. All alarm timers are grouped, alarm timers that cannot be woken up in all the current alarm timers are not considered during grouping, and alarm timers that support wake-up are grouped to obtain batches. When a batch triggering moment of each batch is calculated, a latest moment in a triggering time range of each batch is used as the batch triggering moment of the batch to delay alarm wake-up. This can reduce a quantity of system wake-up times in a time period. The method includes the following steps.

601. A terminal device traverses all alarm timers in an alarm list, and sequentially determines whether each alarm timer supports wake-up. If an alarm timer does not support wake-up, step 602 is performed, or if an alarm timer supports wake-up, step 603 is performed.

The terminal device may traverse all the alarm timers in the alarm list, and all the alarm timers in the alarm list are all alarm timers that are currently registered and set. It may be understood that the alarm timers in the alarm list may exist in a batch form, or may not exist in the batch form. This is not specifically limited herein. When the alarm timers in the alarm list exist in the batch form, each batch may be obtained based on an algorithm in the prior art.

In this embodiment, the terminal device traverses all the alarm timers in the alarm list, and sequentially determines whether each alarm timer supports wake-up; and if the alarm timer does not support wake-up, step 602 is performed, or if the alarm timer supports wake-up, step 603 is performed.

602. The terminal device adds an alarm timer that is determined not to support wake-up in step 601 to a set of alarm timers that cannot be woken up.

In this embodiment, if the terminal device determines, in step 601, that an alarm timer does not support wake-up, that is, determines that the alarm timer is an alarm timer that cannot be woken up, the terminal device may sequentially add the alarm timers that cannot be woken up to the set of alarm timers that cannot be woken up.

603. The terminal device adds an alarm timer that is determined to support wake-up in step 601 to a set of alarm timers that can be woken up.

In this embodiment, if the terminal device determines, in step 601, that an alarm timer supports wake-up, the terminal device may sequentially add the alarm timer that supports wake-up to the set of alarm timers that can be woken up.

604. The terminal device traverses all the alarm timers in the set of alarm timers that can be woken up, and sequentially determines whether each alarm timer supports a window offset. If an alarm timer does not support the window offset, step 605 is performed; or if an alarm timer supports the window offset, step 606 is performed.

After the terminal device sequentially adds all the alarm timers supporting wake-up to the set of alarm timers that can be woken up, the terminal device may traverse all the alarm timers in the set of alarm timers that can be woken up, and sequentially determine whether each alarm timer supports a window offset. If an alarm timer does not support a window offset, that is, the alarm timer is a precise alarm timer supporting wake-up, step 605 is performed; or if an alarm timer supports a window offset, that is, the alarm timer is a non-precise alarm timer supporting wake-up, step 606 is performed. In subsequent steps of this embodiment and subsequent embodiments, for ease of description, unless otherwise specified, the alarm timer is an alarm timer supporting wake-up.

Optionally, if the alarm timers in the alarm list described in the foregoing step 601 exist in the batch form, in step 602 and step 603, the alarm timers may be removed from the original batch, and the set of alarm timers that can be woken up and the set of alarm timers that cannot be woken up are added. The original batch is deleted.

Optionally, in this embodiment, step 601 is identifying the alarm timers that cannot be woken up and the alarm timers that support wake-up in all the alarm timers, and step 604 is identifying a precise alarm timer and a non-precise alarm timer in all the alarm timers that support wake-up. Step 601 and step 604 may be performed simultaneously. When step 601 of sequentially determining whether each alarm timer is an alarm timer that cannot be woken up or an alarm timer that supports wake-up, whether the alarm timer that supports wake-up supports a window offset may be determined at the same time. Alternatively, step 604 may be performed first and then step 601 is performed. This is not specifically limited herein. When step 604 is performed first, some modifications may be made to step 604 and step 601. For example, the modified step 604 may be traversing all the alarm timers in the alarm list, sequentially determining whether each alarm timer supports an offset window, and obtaining a set of alarm timers supporting the offset window and a set of alarm timers not supporting the offset window. The modified step 604 may be separately traversing the set of alarm timers supporting the offset window and the set of alarm timers not supporting the offset window, and sequentially determining whether each alarm timer supports wake-up, to obtain a set of non-precise alarm timers that can be woken up and a set of precise alarm timers that can be woken up.

605. The terminal device determines each precise alarm timer to be in each batch, to obtain each batch including the precise alarm timer, and uses an earliest available triggering moment of each precise alarm timer as a batch triggering moment of each corresponding batch.

The terminal device may group precise alarm timers determined in the foregoing step 604. The terminal device may sequentially use a precise alarm timer as a batch, and use a fixed triggering moment of the precise alarm timer as a batch triggering moment of the batch. In this way, a batch of N precise alarm timers and N corresponding batch triggering moments may be obtained, where N is an integer, and N may be greater than or equal to 0. This is not specifically limited herein. In this embodiment, only an example in which N is greater than 0 is used for description.

606. The terminal device sorts all non-precise alarm timers in ascending order of earliest available triggering moments.

Optionally, the terminal device may group, according to a preset first rule, all non-precise alarm timers determined in step 604, and the terminal device may first sort all the non-precise alarm timers in ascending order of earliest available triggering moments.

607. The terminal device determines, starting from an earliest available triggering moment that is the earliest, non-precise alarm timers of which triggering time ranges have a common intersection set to be in one batch, to obtain each batch including the non-precise alarm timers and a corresponding triggering time range of each batch.

After performing the foregoing step 606, the terminal device may determine the earliest available triggering moment that is the earliest, and the terminal device may start from the earliest available triggering moment that is the earliest, where for example, an earliest available triggering moment of a third alarm timer is the earliest, to group non-precise alarm timer of which triggering time ranges have a common intersection set to be in one batch, where the triggering time ranges of all the non-precise alarm timers in the batch have a common intersection set; and to use the common intersection set of all the non-precise alarm timers in the batch as a triggering time range of the batch. For example, a timer of which a triggering time range intersects with a triggering time range of the third alarm timer and the third timer are determined to be in one batch, which may be denoted as a second batch. Similarly, remaining non-precise alarm timers that are not grouped are sorted in ascending order of earliest available triggering moments, and starting from an earliest available triggering moment that is the earliest in the earliest available triggering moments, where for example, an earliest available triggering moment of a fourth alarm timer is the earliest for the non-precise alarm timers that are not grouped, non-precise alarm timers of which triggering time ranges have an intersection set are grouped into one batch. For example, a timer of which a triggering time range intersects with a triggering time range of the fourth alarm timer and the fourth timer are determined to be in one batch, which may be denoted as a third batch. In this way, M batches of non-precise alarm timers and triggering time ranges corresponding to the M batches are obtained, where M is an integer, and M may be greater than or equal to 0. This is not specifically limited herein. In this embodiment, only an example in which M is greater than 0 is used for description.

In this embodiment, step 605, step 606, and step 607 are a process of grouping all the alarm timers that support wake-up. It may be understood that the foregoing step 605 describes a process of grouping all the precise alarm timers that support wake-up, to correspond to the process of grouping all the non-precise alarm timers supporting wake-up in step 606 and step 607. In step 605, the precise alarm timers supporting wake-up may not be grouped, a precise alarm timer is not used as a batch, or the batch triggering moment of the batch of alarm timers is not determined. In a case of no grouping, N moments are also obtained in a same way, and are N fixed triggering moments in this case.

Optionally, in this embodiment, all the alarm timers that cannot be woken up are determined in step 602, and all the alarm timers that cannot be woken up may be similarly grouped or may not be grouped. This is not specifically limited herein.

608. The terminal device sequentially uses a latest moment in the triggering time range of each batch of non-precise alarm timers as a batch triggering moment of each batch.

After the terminal device performs step 606 and step 607 of grouping, according to the preset first rule, all the non-precise alarm timers supporting wake-up, when the terminal device determines the fixed triggering moment of the non-precise alarm timer in the alarm list, based on the triggering time range of each batch of non-precise alarm timers described in step 607, a latest moment in the triggering time range of each batch may be used as a batch triggering moment of the batch, the batch triggering moment of the batch is used as a fixed triggering moment of all the alarm timers in the batch, and batch triggering moments of the M batches of non-precise alarm timers are determined in sequence, to obtain M triggering moments.

Optionally, the terminal device may store, in the alarm list, each batch and each batch triggering moment determined in step 605 to step 608. For example, refer to an alarm list shown in Table 2. It may be understood that Table 2 is merely an example of the alarm list, and a form and content of the alarm list are not limited. A batch, an alarm, an available triggering moment, whether an offset is supported and an offset window size, and a correspondence between whether wake-up is supported and the available triggering moment may not be stored in a list form, but are recorded in another form. This is not limited in the present invention.

TABLE 2

| Batch | Alarm | Earliest available triggering moment | Whether an offset window is supported/Offset window size | Whether wake-up is supported | Batch triggering moment |
|---|---|---|---|---|---|
| Batch 1 | Alarm A | 3:10 | Yes/12 minutes | Yes | 3:22 AM |
|  | Alarm B | 3:10 | Yes/20 minutes | Yes |  |
| Batch 2 | Alarm C | 3:15 AM | Yes/5 minutes | Yes | 3:20 AM |
|  | Alarm D | 3:18 AM | Yes/2 minutes | Yes |  |
|  | ... |  |  |  |  |
| Batch 3 | Alarm E | 3:10 | Yes/12 minutes | No | / |
| ... | ... | ... | ... | ... |  |

Optionally, in the alarm list, information about all the alarm timers that are determined in step 602 and that cannot be woken up may be stored in a form of a group, or may not be stored in a form of a group. This is not specifically limited herein.

Optionally, step 606 to step 608 are a process in which the terminal device determines the batch triggering moment of each batch of non-precise alarm timers to obtain the M triggering moments, and step 605 is a process in which the terminal device determines the batch triggering moment of each batch of precise alarm timers to obtain the N triggering moments. An execution sequence of the two processes is not limited. One process may be executed before the other process is executed, or the two processes may be executed at the same time. This is not specifically limited herein.

609. The terminal device writes an earliest batch triggering moment into a register of an RTC module.

When setting a fixed triggering moment as the RTC moment, the terminal device may sort the M triggering moments determined in step 605 and the N triggering moments determined in step 608 in ascending order, and set an earliest triggering moment therein as an RTC moment. Details are not described herein again.

It may be understood that, when the precise alarm timers supporting wake-up are not grouped in step 605, the N triggering moments are also obtained. Likewise, when the terminal device sets a fixed triggering moment as the RTC moment, the terminal device may set an earliest moment in the M triggering moments and the N triggering moments as the RTC moment.

Referring to the foregoing description of the process of triggering the alarm timer of which the fixed triggering moment is set as the RTC moment, when timing of the RTC module reaches the RTC moment, all alarm timers in a batch corresponding to the earliest batch triggering moment are triggered, a corresponding application is notified and performs a corresponding operation, and all the alarm timers in the batch corresponding to the earliest batch triggering moment are deleted from the alarm list. Referring to the foregoing description of the process in which the RTC module deletes the RTC moment, the RTC moment is deleted. Details are not described herein again.

For example, if it is determined that a batch triggering moment of a first batch in the M batches of non-precise alarm timers is the earliest in the M triggering moments and the N triggering moments, the terminal device may set the batch triggering moment of the first batch as the RTC moment. When the RTC moment is reached, all alarm timers in the first batch are triggered, applications corresponding to all the alarm timers are notified and perform corresponding operations, and all the alarm timers in the first batch are deleted. For example, the first batch includes a first alarm timer and a second alarm timer. The first alarm timer is registered and set by an AP by running a first application, and the first alarm timer corresponds to a first operation of the first application. The second alarm timer is registered and set by the AP by running a second application, and the second alarm timer corresponds to a second operation of the second application. Therefore, the first application and the second application are triggered to perform the first operation and the second operation. All the alarm timers in the first batch are deleted, and the batch triggering moment of the first batch is also deleted. The terminal device may not process timers in remaining M−1 batches other than the first batch in the M batches, and the terminal device may not process the N timers, either.

The RTC moment may be deleted. When re-setting a fixed triggering moment as the RTC moment, similarly, the terminal device may determine an earliest moment in the N triggering moments and remaining M−1 triggering moments obtained after the batch triggering moment of the first batch is removed from the M triggering moments, and sets the earliest moment as a new RTC moment.

If the triggering moment of the first batch is set as the RTC moment, when the RTC moment is reached, if the terminal device registers and sets a new timer that supports wake-up and has an available triggering time range, or the terminal device modifies a triggering time range of one or more timers in the M−1 batches based on a situation, the terminal device may regroup timers in the M−1 batches based on the first rule. This is not specifically limited herein.

Optionally, for the set of alarm timers that cannot be woken up described in step 602, a fixed triggering moment of an alarm timer that cannot be woken up may not be determined, or a fixed triggering moment of an alarm timer that cannot be woken up may be determined. Optionally, when the fixed triggering moment of the alarm timer that cannot be woken up is determined, all the alarm timers that cannot be woken up in the set of alarm timers that cannot be woken up may be grouped with reference to the method for grouping all current alarm timers supporting wake-up described in step 605 to step 607, or may be grouped according to an algorithm in the prior art. Alternatively, all the alarm timers that cannot be woken up in the set of alarm timers that cannot be woken up may not be grouped. This is not specifically limited herein. During grouping, the fixed triggering moment of the alarm timer may be determined with reference to the methods in step 605 and step 608, or the fixed triggering moment of the alarm timer may be determined according to an algorithm in the prior art. Alternatively, when the grouping is not performed, the fixed triggering moment of the alarm timer that cannot be woken up may be determined according to an algorithm in the prior art. This is not specifically limited herein. It may be understood that the fixed triggering moment of the alarm timer that cannot be woken up may not be set as the RTC moment. When in a normal working state, the AP may determine whether a current moment is not earlier than the earliest available triggering moment or any moment in the triggering time range of the alarm timer that cannot be woken up. If the current moment is not earlier than the earliest available triggering moment or any moment in the triggering time range of the alarm timer that cannot be woken up, the AP may trigger the alarm timer that cannot be woken up. A corresponding application registering the alarm timer that cannot be woken up is notified and performs a corresponding operation.

It may be understood that, a process in which the terminal device performs step 601 to step 609 is implemented by the AP in the normal working state by running an AlarmManager.

Optionally, step 606 to step 608 may not be performed, and the non-precise alarm timers determined in step 604 are not grouped. That is, not all current alarm timers supporting wake-up are grouped. When step 605 to step 608 are not performed, or not all current alarm timers supporting wake-up are grouped, when the terminal device sets a fixed triggering moment as the RTC moment, a process of setting the RTC moment in step 609 changes. Optionally, for each non-precise alarm timer determined in step 604, the terminal device may use a latest available triggering moment of each non-precise alarm timer as a fixed triggering moment of the alarm timer, to determine fixed triggering moments of all current non-precise alarm timers supporting wake-up. For each precise alarm timer determined in step 604, fixed triggering moments of these precise alarm timers are determined. When the RTC moment is set in step 609, the determined fixed triggering moments of all the non-precise alarm timers supporting wake-up and the determined fixed triggering moments of all the precise alarm timers supporting wake-up may be sorted in ascending order, and a current earliest fixed triggering moment is set as the RTC moment. Details are not described herein again.

Referring to the foregoing description of the process of triggering the alarm timer of which the fixed triggering moment is set as the RTC moment, when timing of the RTC module reaches the RTC moment, an alarm timer corresponding to the earliest fixed triggering moment is triggered, a corresponding application is notified and performs a corresponding operation, and the alarm timer corresponding to the earliest fixed triggering moment is deleted from the alarm list. Referring to the foregoing description of the process in which the RTC module deletes the RTC moment, the RTC moment is deleted. Details are not described herein again.

In this embodiment, all the alarm timers are grouped, and the alarm timers that cannot be woken up in all the current alarm timers are not considered during grouping, and the alarm timers supporting wake-up are grouped to obtain each batch. When the batch triggering moment of each batch is calculated, a latest moment in the triggering time range of each batch is used as the batch triggering moment of the batch to delay the alarm wake-up. This can reduce a quantity of system wake-up times in a certain time period.

Figure 7A:
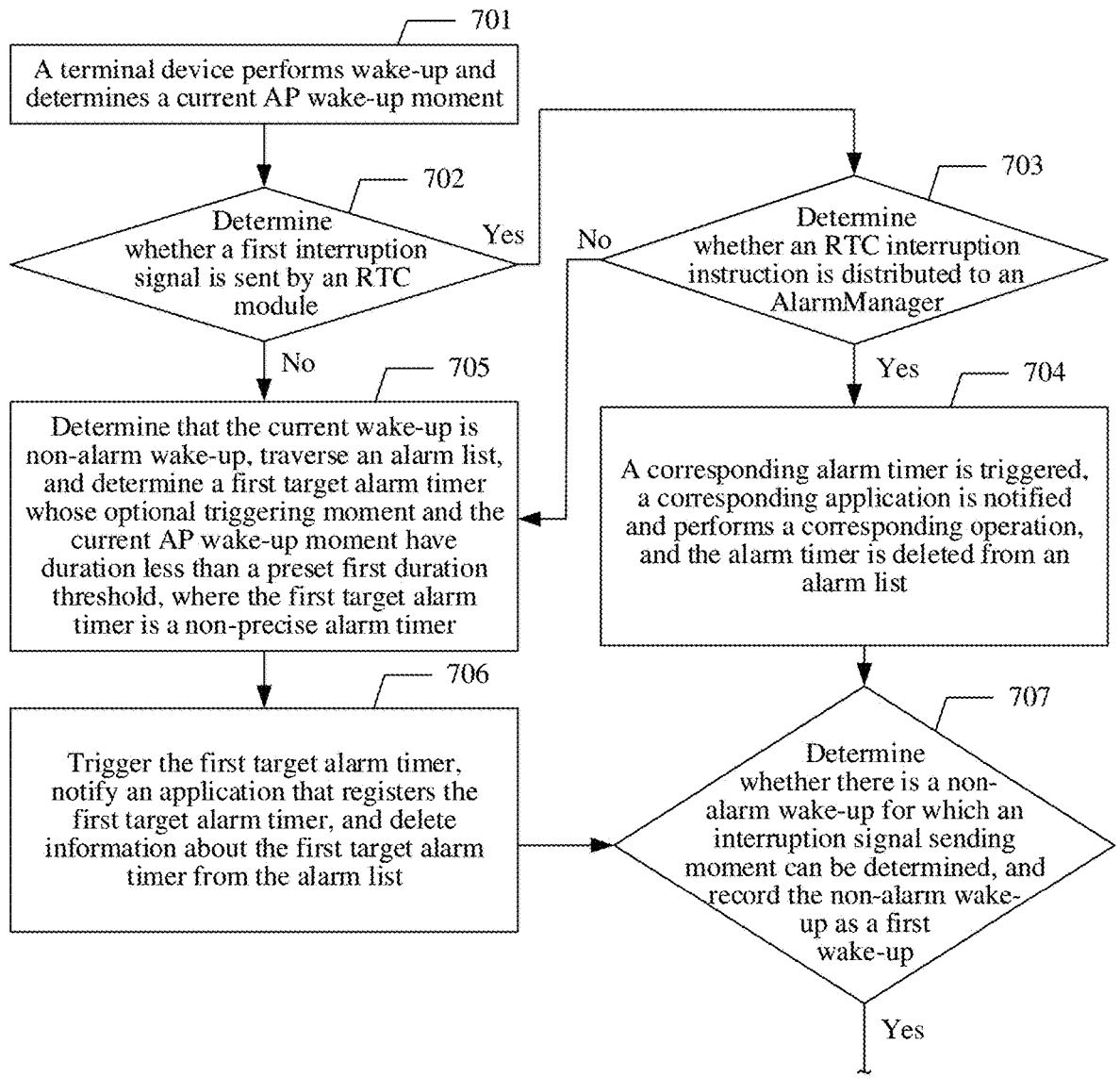
FIG. 7a and FIG. 7b are a flowchart of a timer management method according to an embodiment of this disclosure.
Figure 7B:
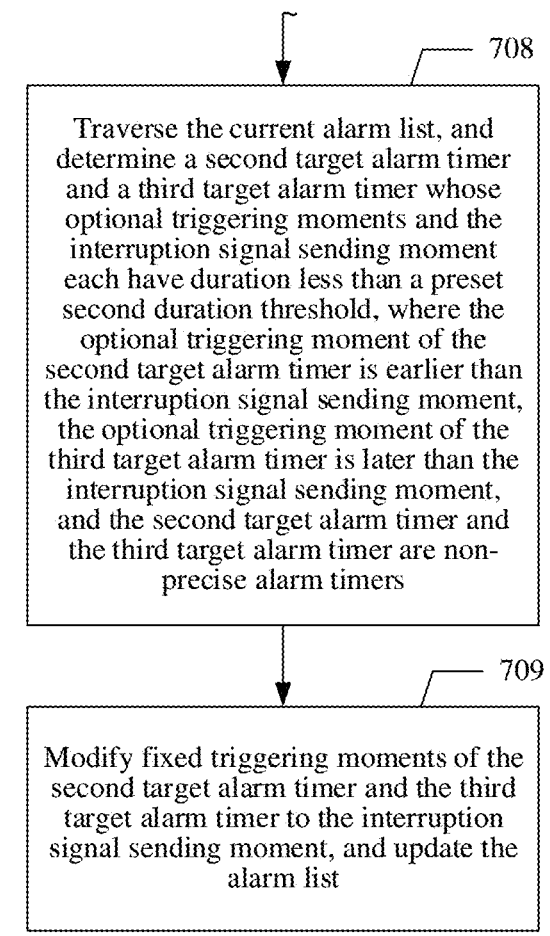

Referring to FIG. 7a and FIG. 7b, an embodiment of this disclosure provides a timer management method. For non-alarm wake-up, an allowed alarm timer is triggered in advance, to reduce a total quantity of system wake-up times. A fixed triggering moment of a non-precise alarm timer is adjusted to be the same as a moment when a non-alarm wake-up interruption signal is sent, to reduce the total quantity of system wake-up times. The method includes the following steps:

701. A terminal device performs wake-up, and determines a current AP wake-up moment.

When in a normal working state, the terminal device executes a sleep algorithm to determine that the terminal device meets a sleep condition, and then the terminal device enters a sleep state. After receiving a first interruption signal, an interruption controller sends the first interruption signal to an AP, to trigger the AP to enter the normal working state from the sleep state. The AP stores a wake-up record, and stores, in the wake-up record, a moment at which the AP is woken up this time. A type of the first interruption signal is further stored in the wake-up record, where the type of the interruption signal indicates a module that sends the interruption signal. The first interruption signal may be sent by an RTC module, a Wi-Fi module, or another module.

Optionally, the AP may determine a sending moment of the first interruption signal, and may record the sending moment of the first terminal signal as a first moment. It may be understood that a moment at which the AP receives the interruption signal is basically the same as the sending moment of the interruption signal, and a moment difference may be ignored; the moment at which the AP receives the interruption signal and a moment at which the AP wakes up may be the same or have a specific error range; and the AP may use the first moment as a current AP wake-up moment.

702. The terminal device queries the wake-up record to determine whether the first interruption signal is sent by the RTC module. If the first interruption signal is sent by the RTC module, step 703 is performed; otherwise, step 705 is performed.

When in the normal working state, the AP may query the wake-up record, and determine, based on the type that is of the first interruption signal and that is stored in the wake-up record, whether the first interruption signal is sent by the RTC module. If it is determined that the first interruption signal is sent by the RTC module, step 703 is performed; or if it is determined that the first interruption signal is not sent by the RTC module, the wake-up performed by the terminal device this time based on the first interruption signal is determined as non-alarm wake-up, and step 705 is performed.

703. The terminal device determines whether an RTC interruption instruction is distributed to an AlarmManager. If it is determined that the RTC interruption instruction is distributed to the AlarmManager, step 704 is performed; or if it is determined that the RTC interruption instruction is not distributed to the AlarmManager, step 705 is performed.

In step 702, it is determined that the RTC module sends the first interruption signal. Referring to the foregoing description of distributing the RTC interruption instruction by the RTC distribution module, if the terminal device determines that the RTC interruption instruction is distributed to the AlarmManager, step 704 is performed. It may be understood that, if the terminal device determines that the RTC interruption instruction is distributed to the AlarmManager, the terminal device may determine that the current wake-up is alarm wake-up; or if the terminal device determines that the RTC interruption instruction is distributed to another software module, the terminal device may determine that the current wake-up is non-alarm wake-up, and step 705 is performed.

704. A corresponding alarm timer is triggered, a corresponding application is notified and performs a corresponding operation, and the alarm timer is deleted from an alarm list.

If the terminal device determines, in step 703, that the RTC interruption instruction is distributed to the AlarmManager, referring to the foregoing description of the process of triggering the alarm timer of which the fixed triggering moment is set as the RTC moment, the corresponding alarm timer is triggered, the corresponding application is notified and performs the corresponding operation, and the alarm timer is deleted from the alarm list. Details are not described herein again. Optionally, step 702 to step 704 may not be performed. Step 702 and step 703 are determining whether the wake-up performed by the terminal device this time based on the first interruption signal is non-alarm wake-up. This provides a possible implementation for the terminal device to determine whether the current wake-up is non-alarm wake-up. The determining may alternatively be performed in another manner, provided that it can be determined whether the wake-up performed by the terminal device this time based on the first terminal signal is non-alarm wake-up. This is not specifically limited herein. If the terminal device determines that the current wake-up is non-alarm wake-up, step 705 is performed.

705. The terminal device determines that the wake-up this time is non-alarm wake-up, traverses an alarm list, and determines a first target alarm timer whose available triggering moment and the AP wake-up moment have duration less than a preset first duration threshold, and the first target alarm timer is a non-precise alarm timer.

If the terminal device determines that the current wake-up performed based on the first interruption signal is non-alarm wake-up, after the AP enters the normal working state, the AP may run the AlarmManager to perform: traversing the alarm list, determining the first target alarm timer whose available triggering moment and the current AP wake-up moment have duration less than the preset first duration threshold, where the first target alarm timer is registered and set by the AP by running a first target application, and corresponds to a first target operation of the first target application, and the first target alarm timer is a non-precise alarm timer.

Optionally, the available triggering moment of the first target alarm timer may be any moment in a triggering time range of the first target alarm timer. When the first target alarm timer is determined, a first target alarm timer whose earliest available triggering moment and the current AP wake-up moment have duration less than the preset first duration threshold may be determined, or a first target alarm timer whose latest available triggering moment and the current AP wake-up moment have duration less than the preset first duration threshold may be determined, or a first target alarm timer of which any moment in the triggering time range and the current AP wake-up moment have duration less than the preset first duration threshold may be determined. This is not specifically limited herein.

Optionally, when alarm timers in the alarm list exist in a batch form and the alarm list stores a batch triggering moment of each batch, the batch triggering moments of the batches may also be traversed. A batch whose batch triggering moment and the current AP wake-up time have duration less than the preset first duration threshold may be determined, and the batch is a batch of non-precise alarm timers. In this case, the first target alarm timer may be all alarm timers in the batch. In this case, the first target alarm timer may be a plurality of alarm timers.

Optionally, when alarm timers in the alarm list exist in a batch form, the batch and the batch triggering moment may be determined according to the method described in FIG. 6a and FIG. 6b.

Optionally, when alarm timers in the alarm list do not exist in the batch form, and the fixed triggering moment of each alarm timer is determined by the AlarmManager according to an algorithm, the fixed triggering moments of the alarm timers in the alarm list may also be traversed. A non-precise alarm timer whose fixed triggering moment and the current AP wake-up moment have duration less than the preset first duration threshold may be determined as the first target alarm timer.

Optionally, when alarm timers in the alarm list do not exist in the batch form, and the fixed triggering moment of each alarm timer is determined by the AlarmManager according to an algorithm, the fixed triggering moment of each alarm timer may be an available triggering moment of each alarm timer. Alternatively, according to the method described in FIG. 6a and FIG. 6b, the fixed triggering moment of each alarm timer may be a latest available triggering moment of each alarm timer.

Optionally, the first duration threshold may be dynamic, or may be static. This is not specifically limited herein. The first duration threshold may be 3 minutes, 5 minutes, or a larger value. The first duration threshold may be determined based on factors such as an application requirement or a current battery level of the terminal. This is not specifically limited herein.

706. The terminal device triggers the first target alarm timer, notifies an application that registers the first target alarm timer, and deletes information about the first target alarm timer from the alarm list.

After the first target alarm timer is determined in step 705, the AP in the normal working state may run the AlarmManager to perform: triggering the first target alarm timer is triggered in advance, where it is not necessary that after the fixed triggering moment of the first target alarm timer is set as the RTC moment, the first target alarm timer is triggered when the fixed triggering moment of the first target alarm timer is reached; after the first alarm timer is triggered, notifying the first target application that registers the first target alarm timer, and running the first target application to perform the corresponding first target operation; and after the first target alarm timer is triggered, deleting the first target alarm timer from the alarm list. The fixed triggering moment of the first target alarm timer may not be set as the RTC moment, thereby reducing a quantity of times that the RTC module sends an interruption signal.

Optionally, if the fixed triggering moment of the first target alarm timer is already set as the RTC moment, when the AP is in the normal working state, the AP may control the RTC module to delete the RTC moment, to reduce a quantity of times that the RTC module sends an interruption signal.

Figure 7C:
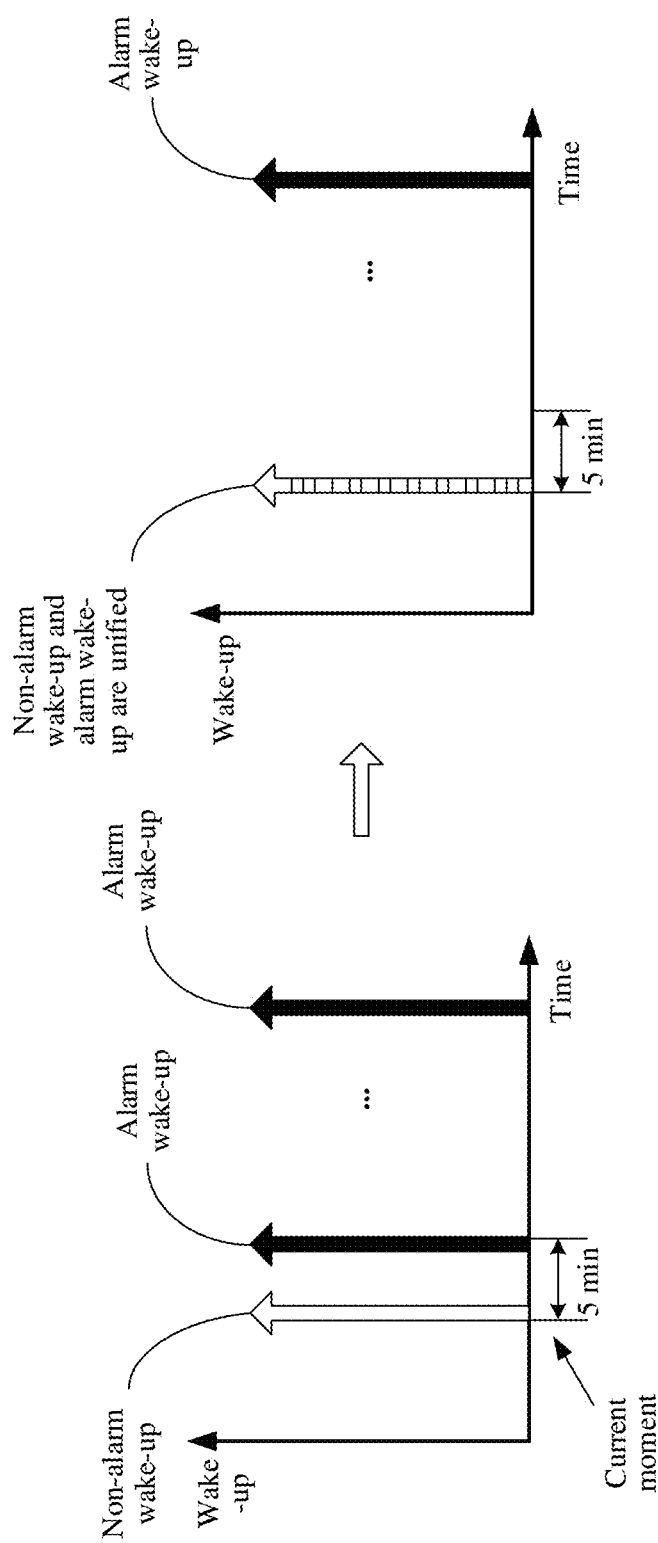
FIG. 7c and FIG. 7d are schematic diagrams of an application scenario according to an embodiment of this disclosure.
Figure 7D:
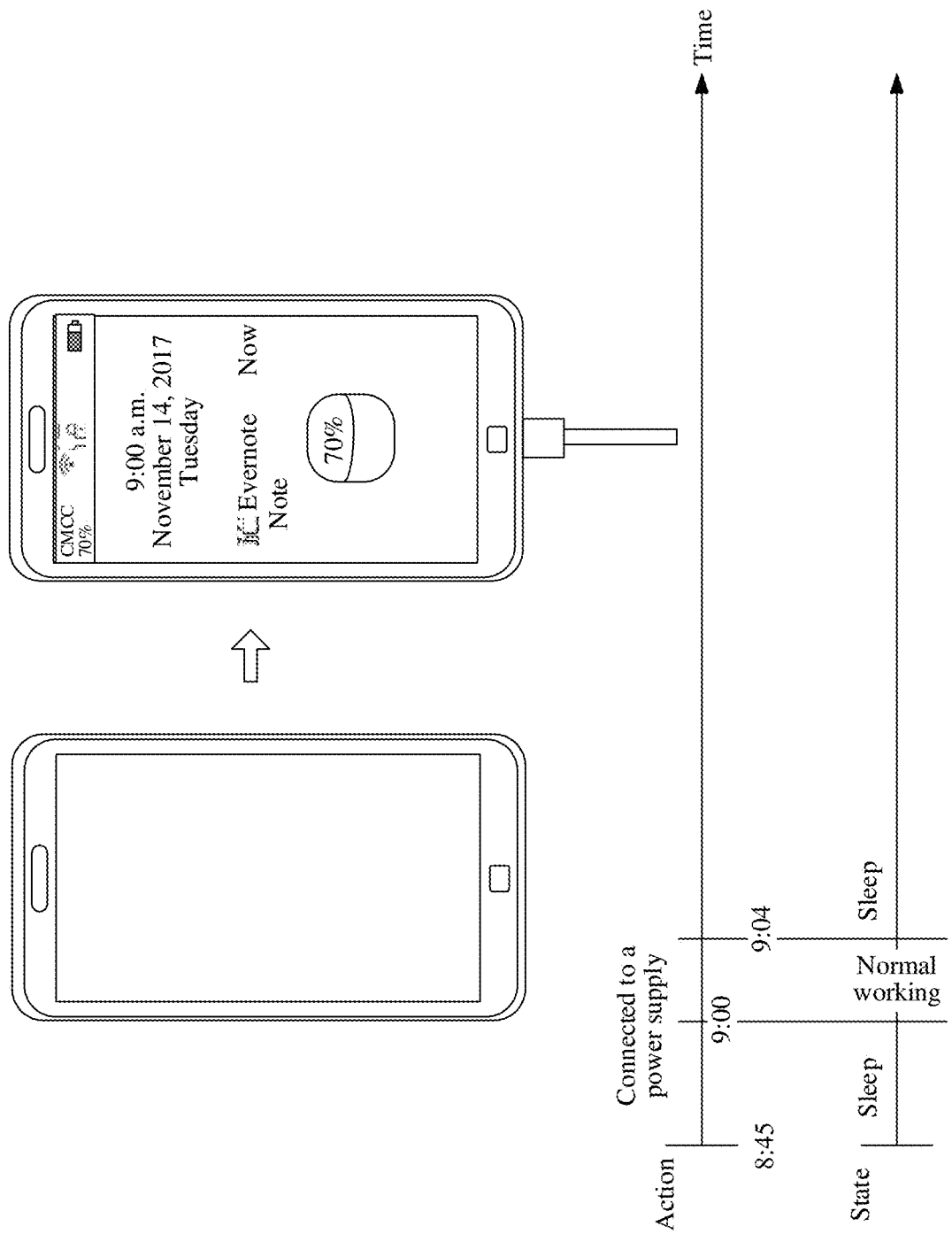

Referring to FIG. 7c and FIG. 7d, with reference to the foregoing description of the process of registering the alarm timer corresponding to the operation related to the application, and with reference to the foregoing description of the process of determining the fixed triggering moment of the non-precise alarm timer in the alarm list, the AP in the normal working state registers a non-precise alarm timer 4 that supports wake-up and that corresponds to a note reminder sent by Evernote, and determines that a fixed triggering moment 4 of the alarm timer 4 is 9:05 a.m. on Nov. 14, 2017. Referring to the foregoing description of the process of setting a fixed triggering moment as the RTC moment, the AP sets the fixed triggering moment 4 of the alarm timer 4 as the RTC moment. At 08:45 a.m., when a sleep condition is met, the AP enters the sleep state, and the screen is turned off. At 9:00 a.m., when a power supply port is connected to a USB cable, a power supply chip sends an interruption signal. After receiving the interruption signal, an interruption controller triggers the AP to enter the normal working state from the sleep state, and the display screen is turned on. The AP determines a wake-up moment is 9:00 a.m. on Nov. 14, 2017. The AP determines that duration between the fixed triggering moment 4 and the wake-up moment is 5 minutes, and the alarm timer 4 is a non-precise alarm. The AP triggers the alarm timer 4 to notify the Evernote application. The Evernote application sends the note reminder and the note reminder is displayed on the display screen. The AP deletes the alarm timer 4 from the alarm list and deletes the RTC moment. At 9:04 a.m., when the sleep condition is met, the AP enters the sleep state again, and the display screen is turned off. At 9:05 a.m., the AP is not woken up to enter the normal working state from the sleep state because of the alarm timer 4.

707. The terminal device determines whether there is a non-alarm wake-up for which an interruption signal sending moment can be determined, and records the non-alarm wake-up as a first wake-up. If there is the non-alarm wake-up for which the interruption signal sending moment can be determined, step 708 is performed.

The terminal device may determine whether there is the non-alarm wake-up for which the interruption signal sending moment can be determined. If there is the non-alarm wake-up for which the interruption signal sending moment can be determined, the non-alarm wake-up may be recorded as the first wake-up, and step 708 is performed.

It may be understood that, the first wake-up may be one non-alarm wake-up, or may be a plurality of non-alarm wake-ups corresponding to one interruption signal sending moment, or may be a plurality of non-alarm wake-ups for which interruption signal sending moments are different. This is not specifically limited herein. Optionally, if there are a plurality of interruption signal sending moments that can be determined, the interruption signal sending moments may be recorded separately, and step 708 is performed for a plurality of times. This is not specifically limited herein. In this embodiment, only an example in which there is one interruption signal sending moment that can be determined for non-alarm wake-up is used for description, and therefore, step 708 is performed once.

Optionally, after step 704 or step 706 is performed, step 707 may not be performed.

708. The terminal device traverses the current alarm list, and determines a second target alarm timer and a third target alarm timer whose available triggering moments and the interruption signal sending moment each have duration less than a preset second duration threshold, where the available triggering moment of the second target alarm timer is earlier than the interruption signal sending moment, the available triggering moment of the third target alarm timer is later than the interruption signal sending moment, and the second target alarm timer and the third target alarm timer are non-precise alarm timers.

If the terminal determines that there is one interruption signal sending moment that can be determined for non-alarm wake-up, the moment may be recorded as a second moment, and the AP in the normal working state may run the AlarmManager to perform: traversing the alarm list, and determining the non-precise second target alarm timer and the non-precise third target alarm timer in the alarm list. A first available triggering moment of the second target alarm timer is earlier than the second moment, and duration between the first available triggering moment and the second moment is less than the preset second duration threshold. A second available triggering moment of the third target alarm timer is later than the second moment, and duration between the second available triggering moment and the second moment is less than the preset second duration threshold. It may be understood that the second target alarm timer may be one alarm timer or a plurality of alarm timers, and the third target alarm may be one alarm timer or a plurality of alarm timers. This is not specifically limited herein.

Optionally, the duration between the second available triggering moment and the second moment may also be less than a preset third duration threshold, where the third duration threshold is different from the second duration threshold. This is not specifically limited herein.

Optionally, the first available triggering moment may be any moment in a first triggering time range of the second target alarm timer. When the second target alarm timer is determined, a second target alarm timer whose earliest available triggering moment and the second moment have duration less than the preset second duration threshold may be determined, or a second target alarm timer whose latest available triggering moment and the second moment have duration less than the preset second duration threshold may be determined, or a second target alarm timer of which any moment in the triggering time range and the second moment have duration less than the preset second duration threshold may be determined. This is not specifically limited herein. Similarly, the second available triggering moment may be any moment in a second triggering time range of the third target alarm timer. The third target alarm timer may also be determined in the foregoing plurality of manners. Details are not described herein again.

Optionally, the second duration threshold or the third duration threshold may be dynamic, or may be static. This is not specifically limited herein. The second duration threshold or the third duration threshold may be 3 minutes, 5 minutes, or a larger value. The second duration threshold or the third duration threshold may be determined based on a factor such as an application requirement or a current battery level of the terminal. This is not specifically limited herein. Optionally, the second duration threshold or the third duration threshold may be the same as or different from the first duration threshold. This is not specifically limited herein.

709. The terminal device modifies fixed triggering moments of the second target alarm timer and the third target alarm timer to the interruption signal sending moment, and updates the alarm list.

The AP in the normal working state runs the AlarmManager to perform: modifying a first fixed triggering moment of the second target alarm timer and a second fixed triggering moment of the third target alarm timer to the second moment, and updating the alarm list.

Optionally, after the first fixed triggering moment of the second target alarm timer and the second fixed triggering moment of the third target alarm timer are modified to the second moment, the first triggering time range of the second target alarm timer may be further deleted, so that the second target alarm timer can become a precise alarm timer, and similarly, the third target alarm timer can become a precise alarm timer.

Figure 7E:
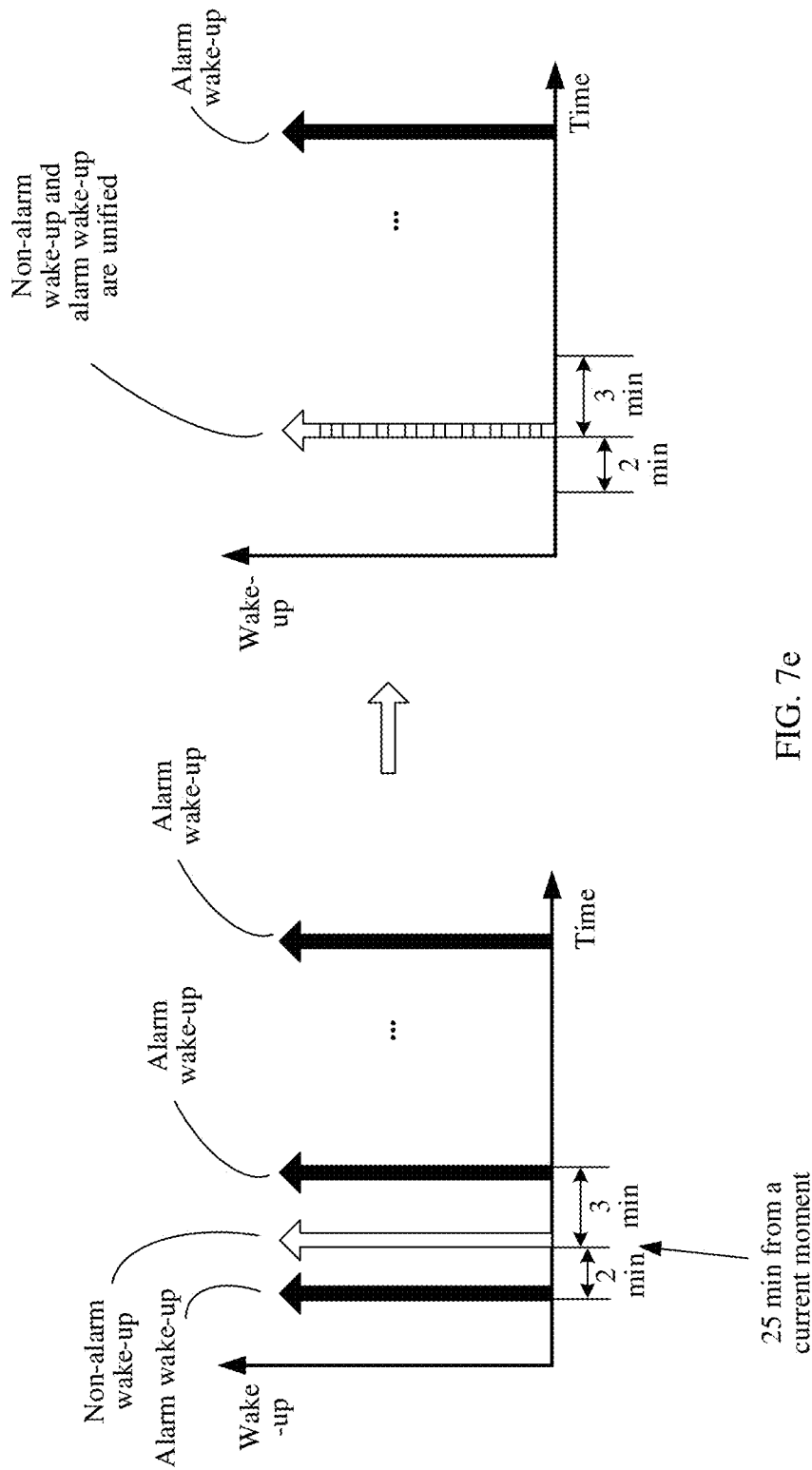
FIG. 7e is a schematic diagram of an application scenario according to an embodiment of this disclosure.

Referring to FIG. 7*e*, the AP in the normal working state determines that a sensor hub sends an interruption signal 25 minutes after a current moment, and the AP in the normal working state runs the AlarmManager to perform: determining that an available triggering moment of the second target alarm timer is 23 minutes from the current moment, where the second target alarm timer is a registered non-precise alarm timer that supports wake-up and that corresponds to the note reminder sent by the Evernote; determining that an available triggering moment of the third target alarm timer is 28 minutes from the current moment, where the third target alarm timer is a registered non-precise alarm timer that supports wake-up and that corresponds to a heartbeat packet sent by a WeChat application; and modifying the fixed triggering moments of the second target alarm timer and the third target alarm timer to an interruption signal sending moment of the sensor hub, so that the second target alarm timer and the third target alarm timer may be set as precise alarms.

It may be understood that step 702 to step 709 are performed when the terminal device is in the normal working state.

Optionally, step 707 to step 709 may be not performed after step 704 and/or step 706. Step 707 to step 709 may be separately performed, with no need to perform step 701 to step 706. As long as the terminal device is in the normal working state, step 707 to step 709 may be performed. Optionally, step 707 to step 709 may not be performed.

Preferably, the terminal device completes step 702 to step 709 before entering the sleep state. Optionally, the terminal device may alternatively enter the sleep state after performing any step of step 702 to step 709. In this embodiment, step 702 to step 709 do not change the sleep algorithm performed by the terminal device and the sleep condition.

In this embodiment, when the terminal device performs the non-alarm wake-up, the terminal device triggers the allowed alarm timer in advance, to reduce a total quantity of system wake-up times. In addition, the terminal device may adjust a fixed triggering moment of a non-precise alarm timer, and adjust the fixed triggering moment to be the same as the interruption signal sending moment in the non-alarm wake-up, to reduce the total quantity of system wake-up times.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this application. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A wake-up management method, wherein at least two timers are set in a terminal device, the at least two timers support wake-up, and each of the at least two timers corresponds to an operation related to an application; the method comprising:
   determining whether each of the at least two timers has a triggering time range;
   grouping, according to a preset rule, timers having triggering time ranges, to obtain M timer group(s), wherein M is an integer greater than 0, and a common intersection set of triggering time ranges of all timers in each of the M timer group(s) is not empty;
   determining a triggering moment of each of the M timer group(s), to obtain M triggering moment(s);
   determining N timer(s) that have no triggering time range, and determining a triggering moment of each of the N timer(s), to obtain N triggering moment(s), wherein N is an integer greater than 0; and
   setting an earliest moment in the M triggering moment(s) and the N triggering moment(s) as an RTC moment;
   wherein: when the RTC moment is reached, the terminal device performs a wake-up if the terminal device is in a sleep state.

2. The method according to claim 1, wherein the determining the triggering moment of each of the M timer group(s) comprises:
   when the triggering moment of a first timer group in the M timer group(s) is determined, determining that a latest moment in a first intersection set is the triggering moment of the first timer group, wherein the first intersection set is a common intersection set of triggering time ranges of all timers in the first timer group, the first timer group comprises a first timer and a second timer that have different triggering time ranges, the first timer corresponds to a first operation of a first application, and the second timer corresponds to a second operation of a second application.

3. The method according to claim 2, wherein the method further comprises:
   if the triggering moment of the first timer group is set as the RTC moment, triggering all the timers in the first timer group when the RTC moment is reached; and
   performing the first operation and the second operation when the RTC moment is reached; and
   after the triggering all the timers in the first timer group, the method further comprises:
   deleting all the timers in the first timer group.

4. The method according to claim 2, wherein the method further comprises:
if the triggering moment of the first timer group is set as the RTC moment, deleting the triggering moment of the first timer group when the RTC moment is reached; and setting as a new RTC moment, an earliest moment in the N triggering moment(s) and any remaining M−1 triggering moment(s) obtained after the triggering moment of the first timer group is removed from the M triggering moment(s).

5. The method according to claim 1, wherein the M timer group(s) at least includes a first timer group comprising a first timer and a second timer, and wherein the grouping according to the preset rule, of the timers having triggering time ranges comprises:
sorting the timers having the triggering time ranges in ascending order of earliest available triggering moments;
if it is determined that an earliest available triggering moment of a third timer is the earliest, determining a timer of which a triggering time range intersects with a triggering time range of the third timer and the third timer to be in a second timer group;
sorting in ascending order of earliest available triggering moments, timers that are in the timers having the triggering time range and that are not determined to be in the second timer group; and
if it is determined that an earliest available triggering moment of a fourth timer is the earliest, determining a timer of which a triggering time range intersects with a triggering time range of the fourth timer and the fourth timer to be in a third timer group.

6. A terminal device, comprising a memory and one or more processors, wherein the memory stores one or more programs, the one or more programs comprise instructions, and when the instructions are executed by the terminal device, the terminal device is enabled to perform:
setting at least two timers, wherein the at least two timers support wake-up, and each of the at least two timers corresponds to an operation related to an application; determining whether each of the at least two timers has a triggering time range; grouping, according to a preset rule, timers that have triggering time ranges, to obtain M timer group(s), wherein M is an integer greater than 0, and a common intersection set of triggering time ranges of all timers in each of the M timer group(s) is not empty; determining a triggering moment of each of the M timer group(s), to obtain M triggering moment(s); determining N timer(s) that have no triggering time range, and determining a triggering moment of each of the N timer(s), to obtain N triggering moment(s), wherein N is an integer greater than 0; setting an earliest moment in the M triggering moment(s) and the N triggering moment(s) as an RTC moment; and when the RTC moment is reached, performing wake-up if the terminal device is in a sleep state.

7. The terminal device according to claim 6, wherein when the instructions are executed by the terminal device, the terminal device is further enabled to perform:
when determining the triggering moment of a first timer group in the M timer group(s), determining that a latest moment in a first intersection set is the triggering moment of the first timer group, wherein the first intersection set is the common intersection set of triggering time ranges of all timers in the first timer group, the first timer group comprises a first timer and a second timer that have different triggering time ranges, the first timer corresponds to a first operation of a first application, and the second timer corresponds to a second operation of a second application.

8. The terminal device according to claim 7, wherein when the instructions are executed by the terminal device, the terminal device is further enabled to perform:
if the triggering moment of the first timer group is set as the RTC moment, triggering all timers in the first timer group when the RTC moment is reached; performing the first operation and the second operation; and after all the timers in the first timer group are triggered, deleting all the timers in the first timer group.

9. The terminal device according to claim 7, wherein when the instructions are executed by the terminal device, the terminal device is further enabled to perform:
if the triggering moment of the first timer group is set as the RTC moment, deleting the triggering moment of the first timer group when the RTC moment is reached; and setting, as a new RTC moment, an earliest moment in the N triggering moment(s) and any remaining M−1 triggering moments obtained after the triggering moment of the first timer group is removed from the M triggering moment(s).

10. The terminal device according to claim 6, wherein M timer group(s) at least includes a first timer group comprising a first timer and a second timer, and wherein when the instructions are executed by the terminal device, the terminal device is further enabled to perform:
sorting the timers having the triggering time ranges in ascending order of earliest available triggering moments; if it is determined that an earliest available triggering moment of a third timer is the earliest, determining a timer of which a triggering time range intersects with a triggering time range of the third timer and the third timer to be in a second timer group; sorting, in ascending order of earliest available triggering moments, timers that are in the timers having the triggering time ranges and that are not determined to be in the second timer group; and if it is determined that an earliest available triggering moment of a fourth timer is the earliest, determining a timer of which a triggering time range intersects with a triggering time range of the fourth timer and the fourth timer to be in a third timer group.

\* \* \* \* \*